United States Patent
Bessho et al.

(10) Patent No.: US 10,124,659 B2
(45) Date of Patent: Nov. 13, 2018

(54) UTILITY WORK VEHICLE

(71) Applicant: Kubota Corporation, Osaka-shi (JP)

(72) Inventors: Hiroki Bessho, Sakai (JP); Kensuke Okabe, Sakai (JP); Taro Nakamura, Sakai (JP); Junichi Fujiwara, Sakai (JP); Toshiki Ono, Sakai (JP); Takafumi Komatsu, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 15/163,976

(22) Filed: May 25, 2016

(65) Prior Publication Data
US 2017/0001549 A1 Jan. 5, 2017

(30) Foreign Application Priority Data

Jul. 2, 2015 (JP) ................................. 2015-133946
Jul. 2, 2015 (JP) ................................. 2015-133947
Jul. 2, 2015 (JP) ................................. 2015-133951

(51) Int. Cl.
*B60K 1/04* (2006.01)
*B60K 13/04* (2006.01)
(Continued)

(52) U.S. Cl.
CPC ............... *B60K 1/04* (2013.01); *B60K 13/02* (2013.01); *B60K 13/04* (2013.01); *B62D 21/11* (2013.01); *B62D 23/005* (2013.01)

(58) Field of Classification Search
None
See application file for complete search history.

(56) References Cited

U.S. PATENT DOCUMENTS

| 4,401,093 A * | 8/1983 | Gates, Jr. ............... F01M 11/04 |
|---|---|---|
| | | 123/572 |
| 8,499,870 B2 | 8/2013 | Nakamura et al. |
| (Continued) | | |

FOREIGN PATENT DOCUMENTS

| JP | 2006076530 A | 3/2006 |
|---|---|---|
| JP | 2011116318 A | 6/2011 |
| (Continued) | | |

*Primary Examiner* — John D Walters
*Assistant Examiner* — Hilary L Johns
(74) *Attorney, Agent, or Firm* — The Webb Law Firm

(57) ABSTRACT

Provided is a utility work vehicle including an engine section, a speed changer device and a belt type stepless speed changer device, a rear frame supporting the engine section, and a main frame supporting the rear frame. The rear frame includes right and left rear wheel supporting portions, each of which has a front supporting member and a rear supporting member extending upwards from the rear frame. The rear supporting member disposed on more rear side of the vehicle body than the belt type stepless speed changer device has its upper end connected to a rear frame portion of the main frame. The front supporting member is disposed on more laterally outer side of the vehicle body than the belt type stepless speed changer device. Between an upper end of the front supporting member and the rear frame portion, there is formed a space that allows attachment/detachment of a speed changer cover detachably attached to the belt type stepless speed changer device from a laterally outer side of the vehicle body.

17 Claims, 19 Drawing Sheets

(51) Int. Cl.
*B60K 13/02* (2006.01)
*B62D 21/11* (2006.01)
*B62D 23/00* (2006.01)

(56) References Cited

U.S. PATENT DOCUMENTS

| | | |
|---|---|---|
| 8,776,939 B2 | 7/2014 | Kuramoto |
| 2008/0093236 A1 | 4/2008 | Connelly et al. |
| 2012/0055729 A1 | 3/2012 | Bessho et al. |
| 2012/0138379 A1* | 6/2012 | Tsuji .................... E02F 3/7609 180/309 |
| 2014/0113766 A1 | 4/2014 | Yagyu et al. |

FOREIGN PATENT DOCUMENTS

| | | |
|---|---|---|
| JP | 201251506 A | 3/2012 |
| JP | 201343481 A | 3/2013 |
| JP | 201343526 A | 3/2013 |
| JP | 2014133489 A | 7/2014 |

\* cited by examiner

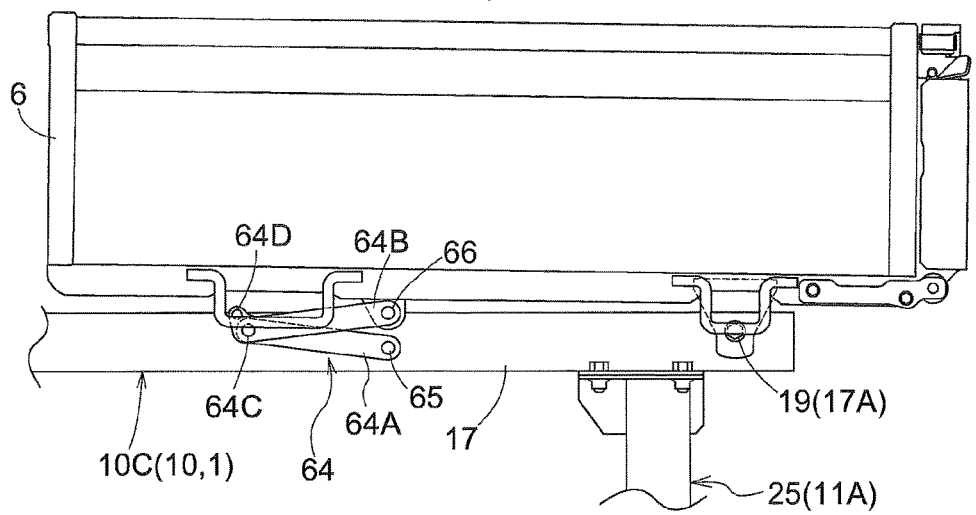
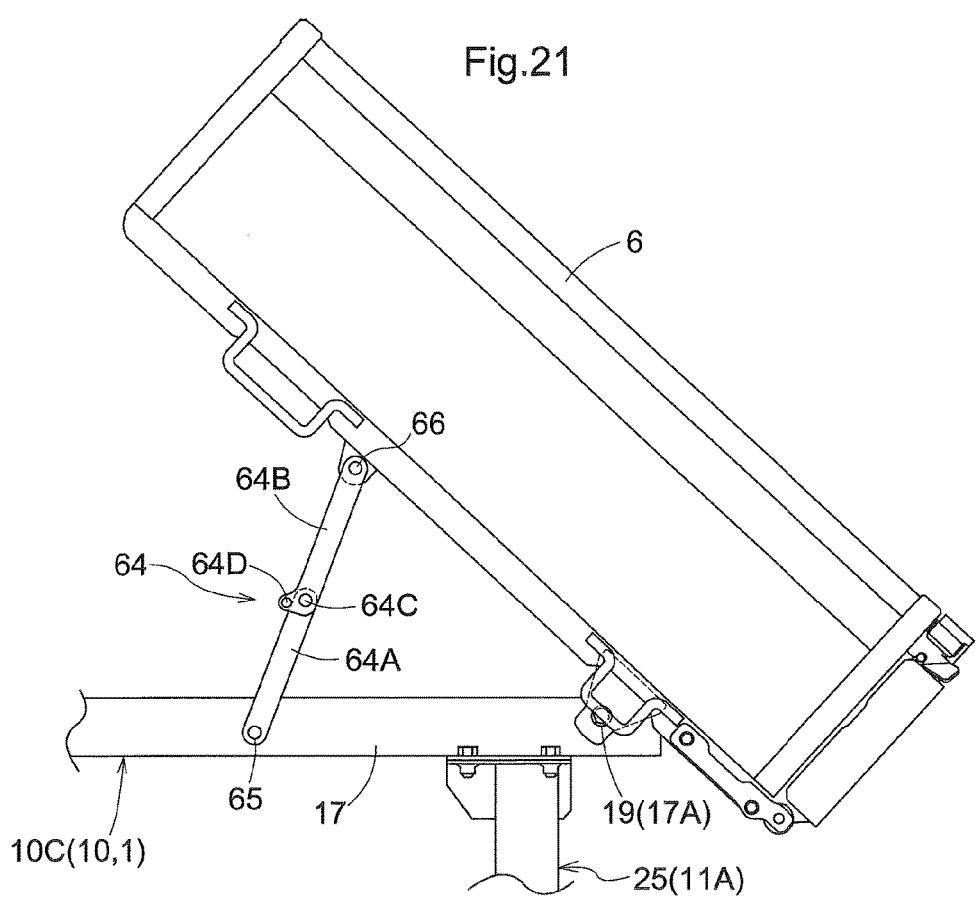

UTILITY WORK VEHICLE

CROSS-REFERENCE TO RELATED APPLICATIONS

This application claims priority to Japanese Patent Application Nos. 2015-133946, 2015-133947, and 2015-133951 all filed Jul. 2, 2015, the disclosures of which are hereby incorporated in their entirety by reference.

BACKGROUND OF THE INVENTION

1. Field of the Invention
The present invention relates to a utility work vehicle.
2. Description of Related Art
(1) First Related Art
JP 2013-043481 A (U.S. Pat. No. 8,776,939 B2) discloses an example of a utility work vehicle having a rear fame supporting an engine section and a main frame supporting the rear frame. This utility work vehicle includes right and left upper frames and a detachable frame unit supporting a driving section. In this utility work vehicle, the detachable frame unit connects a mount frame to the right and left upper frames via front and rear vertical frames disposed at right and left end portions of the mount frame. Each vertical fame pivotally supports upper and lower rear suspension arms. The driving section connects the engine, a transmission case and a hydrostatic stepless speed changer device, in this order and the hydrostatic stepless speed changer device is mounted at a rear end portion of a vehicle body.

Another conventional utility work vehicle is disclosed in JP 2014-133489 A. This utility work vehicle includes, in its engine section, an engine, a belt type stepless speed changer device and a transmission case. The engine is disposed with its crank shaft being oriented laterally. The transmission case is disposed with its input shaft being oriented laterally. The belt type stepless speed changer device is disposed at a position laterally of the engine and the transmission case.

In the utility work vehicle disclosed in JP 2013-043481 A (U.S. Pat. No. 8,776,939 B2), if the engine section described in JP 2014-133489 A is employed in place of the driving section, the front side vertical frame of the front and rear vertical frames extending from the mount frame to the upper frames is to be disposed on a laterally outer side of the belt type stepless speed changer device. Therefore, when a maintenance operation of the belt type stepless speed changer device is to be effected, the front side vertical frame will be obstructive, so that attachment/detachment of a speed changer cover detachably attached to the belt type stepless speed changer device, replacement of a transmission belt, etc. will become difficult.

Accordingly, there is a need for a frame arrangement suitable for supporting an engine section having a belt type stepless speed changer device.

(2) Second Related Art
JP 2013-043526 A discloses an example of a utility work vehicle having a vehicle body frame, and a load-carrying platform connected to a rear portion of the vehicle body frame to be pivotable up/down relative thereto. In this utility work vehicle, the load-carrying platform is supported to be pivotable about a laterally oriented axis disposed adjacent a rear end of the traveling vehicle body, so that a front end side of the load-carrying platform can be lifted up/down by actuation of a hydraulic dump cylinder. In this utility work vehicle, to a cylinder member of the dump cylinder, a pressure-resistant hose extended from a hydraulic pump driven by the engine is connected as an oil passage for extending/contracting a piston member. Further, with this utility work vehicle, feeding/discharging of oil to/from a cylinder chamber of the cylinder member is controlled by a dump control valve interposed between the hydraulic pump and the cylinder chamber. And, with this utility work vehicle, a lower end portion of the cylinder member is pivotally supported to a support bracket extending inwardly from vicinity of a rear end of a right main frame.

With the above-described arrangement, in case e.g. the dump cylinder is to be actuated with use of an amount of oil present inside the speed changer device, it is necessary to dispose the various hydraulic instruments for lifting up/down the load-carrying platform such as a hydraulic pump, a dump control valve, a dump cylinder, etc. at appropriate positions distributed in the vehicle body and then to lay out a hydraulic hose for lifting up/down the load-carrying platform between and across these various hydraulic instruments for lifting up/down the load-carrying platform. For this reason, in case a utility work vehicle is to be configured as a hydraulic lifting type for hydraulically lifting up/down the load-carrying platform, significant amount of labor will be required.

Accordingly, there is a need for reducing labor in case a utility work vehicle is to be configured as such hydraulic lifting type.

SUMMARY OF THE INVENTION (1) In view of the "First Related Art", there is provided:
A utility work vehicle comprising:
an engine section including an engine having its output shaft oriented laterally along a right/left direction of a vehicle body, a speed changer device having its input shaft oriented laterally along the right/left direction of the vehicle body, the speed changer device being disposed rearwardly of the engine, and a belt type stepless speed changer device disposed on one right/left side of the engine and the speed changer device and configured to transmit power from the engine to the speed changer device;
a rear frame supporting the engine section, the rear frame including right and left rear wheel supporting portions provided at right and left end portions disposed on more laterally outer sides of the vehicle body than the engine section and configured to support right and left rear wheels via right and left rear suspensions, each one of the right and left rear wheel support portions having a front supporting member and a rear supporting member extending upwards from the rear frame; and
a main frame supporting the rear frame;
wherein the rear supporting member is disposed on more rear side of the vehicle body than the belt type stepless speed changer device, the rear supporting member having a vertical length extending from the rear frame to a rear frame portion of the main frame disposed upwardly of this rear frame to connect an upper end portion of the rear supporting member to the rear frame portion; and
wherein the front supporting member is disposed on more laterally outer side of the vehicle body than the belt type stepless speed changer device, the front supporting member having a vertical length smaller than the rear supporting member, the front supporting member forming, between an upper end of this front supporting member and the rear frame portion, a space that allows attachment/detachment of a speed changer cover detachably attached to the belt type stepless speed changer device from a laterally outer side of the vehicle body.

With the above-described arrangement, supporting of the rear frame by the main frame can be effected via the right and left rear supporting members. And, when a maintenance operation of the belt type stepless speed changer device is to be effected, through utilization of the space formed between the upper end of the front supporting member and the rear frame portion, attachment/detachment of a speed changer cover detachably attached to the belt type stepless speed changer device, replacement of a transmission belt, etc. can be effected easily.

According to one preferred embodiment:

the engine section includes an exhaust gas treating device; and the rear frame portion includes right and left side members to which an upper end portion of the rear supporting member is connected, and a cross member disposed between the front supporting member and the rear supporting member and connecting the right and left side members to each other, the cross member having its right and left end portions disposed on more laterally outer sides of the vehicle body than the right and left side members, the cross member, via its right and left end portions, supporting upper end portions of right and left shock absorbers provided in the right and left rear suspensions.

With this arrangement, the right and left shock absorbers, etc. included in the right and left rear suspensions can be disposed, across e.g. the right and left side members, at positions on laterally outer sides of the vehicle body away from the engine section including heat sources such as the exhaust gas treating device.

As a result, in comparison with e.g. an arrangement in which the upper end portions of the right and left shock absorber are disposed on more inner sides of the vehicle body than the right and left side members, thermal damage due to radiation heat from such heat source as the exhaust gas treating device can be made to occur less likely in e.g. the right and left shock absorbers.

Further, by supporting the right and left shock absorbers with the single cross member, in comparison with e.g. an arrangement of the right and left shock absorbers being supported by right and left supporting members provided separately on right and left sides of the rear frame portion, it is possible to simply the arrangement required for supporting the right and left shock absorbers and also to facilitate assembly of the right and left shock absorbers at appropriate positions.

According to one preferred embodiment:

the cross member includes extension portions extending from its right and left end portions to positions on more laterally outer sides of the vehicle body than the upper end portions of the right and left shock absorbers; and an electric cable supporting clamp is attached to at least one of the right and left extension portions, with the clamp protruding laterally outwardly of the vehicle body from the extension portion associated therewith.

With this arrangement, for connection to electronic instruments to be disposed on more rear sides of the vehicle body than the right and left shock absorbers, portions of various electric cables to be installed along the right and left side members can be installed with bypassing the upper end portions of the right and left shock absorbers, via positions on more laterally outer sides of the vehicle body than the upper end portions of the right and left shock absorbers.

As a result, it is possible to avoid the risk of the various electric cables laid along the right and left side members coming into inadvertent contact with the upper portions of the right and left shock absorbers connected to the right and left opposed ends of the cross member.

According to one preferred embodiment:

there are provided a load-carrying platform connected to the rear frame portion to be pivotally lifted up/down relative thereto, and an electro-hydraulic cylinder for lifting up/down the load-carrying platform; and the electro-hydraulic cylinder is supported by the rear supporting member.

With this arrangement, since the rear supporting member has a high strength originally, the electro-hydraulic cylinder can be supported firmly with the high supporting strength, without providing a supporting member specially therefor.

Further, as the rear supporting member is disposed on more rear side of the vehicle body than the axle of the rear wheels, assembly and maintenance of the electro-hydraulic cylinder can be done easily from the rear outer side of the vehicle body.

According to one preferred embodiment:

the rear frame includes, on its front and rear end sides, right and left supporting portions for supporting right and left supported portions provided at front and rear end portions of the engine section;

one of the supporting portion and the supported portion has a U-shape in its plan view having a pair of vertical walls opposed to each other, and the other of the supporting portion and the supported portion is formed like a cylinder disposed between the pair of vertical walls with opposed ends of the cylinder being adjacent the pair of vertical walls;

the supporting portion is configured to support the supported portion in anti-vibration manner, via a tubular anti-vibration rubber engaged inwardly with one of this supporting portion and the supported portion and a support shaft extending through the anti-vibration rubber between the pair of vertical walls;

a movement restricting direction of the supported portion is made to differ between a support state of the right and left supported portions by the right and left supporting portions on a front end side of the rear frame and a support state of the right and left supported portions by the right and left supporting portions on a rear end side of the rear frame;

in one of the two support states, the supporting portions or the supported portions are located between the pair of vertical walls which are disposed side by side on the right and left sides, so that movement in right/left direction is restricted; and in the other of the two support states, the supporting portions or the supported portions are located between the pair of vertical walls which are disposed side by side on the front and rear sides, so that movement in front/rear direction is restricted.

With this arrangement, it is possible to minimize vibration of the engine section in the front/rear direction and right/left direction in association with operation of the engine section, while ensuring vibration resistance against vertical vibration of the engine section in association with operation of the engine section such as the engine. With this, e.g. at the time of starting of the engine when the vibration of the engine section is large, it is possible to avoid risk of interference between the engine section and the peripheral parts adjacent thereto in the horizontal direction.

(2) In view of the "Second Related Art", there is provided:

A utility work vehicle comprising:

a vehicle body frame, the vehicle body frame including, at its rear end portion, right and left rear wheel supporting portions for supporting right and left rear wheels via right and left rear suspensions;

a load-carrying platform connected to a rear portion of the vehicle body frame to be liftable up/down relative thereto; and an electro-hydraulic cylinder for lifting up/down the load-carrying platform, the electro-hydraulic cylinder being supported by one rear wheel supporting portion of the right and left rear wheel supporting portions.

With this arrangement, the electro-hydraulic cylinder integrally includes a hydraulic cylinder, a hydraulic pump, an electric motor for driving the hydraulic pump, and a valve unit for switching over flow of oil. And, the valve unit and the hydraulic cylinder are operated by oil present inside the electro-hydraulic cylinder and fed by the hydraulic pump. Thus, by installing the electro-hydraulic cylinder to and between the vehicle body frame and the load-carrying platform and then connecting an electric cable to the electro-hydraulic cylinder, the utility work vehicle can be configured as a hydraulically lifting type.

Namely, there is no need to dispose the respective hydraulic instruments such as a hydraulic pump, an electromagnetic control valve, and a hydraulic cylinder for lifting up/down the load-carrying platform, at appropriate positions of the vehicle body in distribution. Further, there is no need to install a hydraulic pipe for load-carrying platform lifting to and between the respective hydraulic instruments for platform lifting. Therefore, labor or trouble required when the utility work vehicle is to be configured as a hydraulic lifting type can be reduced and also maintenance of the electro-hydraulic cylinder can be effected easily.

And, as the electro-hydraulic cylinder is supported by the rear wheel supporting portion, the electro-hydraulic cylinder is located at a rear end portion of the vehicle body. Thus, installment of the electro-hydraulic cylinder, connection of the electric cable to the electro-hydraulic cylinder, etc. can be done easily from the rear outer side of the vehicle body. As a result, labor required when the utility work vehicle is to be configured as a hydraulic lifting type can be further reduced and also maintenance of the electro-hydraulic cylinder can be effected easily.

Moreover, as the right and left rear wheel supporting portions have high strength originally for supporting the rear wheels, the electro-hydraulic cylinder can be supported firmly with the high supporting strength, without providing any supporting member specially therefor. Consequently, the arrangement of the vehicle body frame for supporting the electro-hydraulic cylinder etc. can be simplified.

According to one preferred embodiment, the utility work vehicle further comprises:

an air cleaner; and an exhaust gas treating device;

wherein the air cleaner and the exhaust gas treating device are disposed side by side on the right and left sides between the right and left rear wheel supporting portions; and the electro-hydraulic cylinder is supported by the air cleaner side rear wheel supporting portion adjacent the air cleaner of the right and left rear wheel supporting portions.

With this arrangement, the electro-hydraulic cylinder which is vulnerable to influence of temperature can be disposed at a position far from the temperature-rising exhaust gas treating device, across the air cleaner. Thus, it becomes possible to make it difficult for heat discharge of the exhaust gas treating device to be exerted to the electro-hydraulic cylinder. As a result, it becomes possible to stabilize the lifting speed of the load-carrying platform by the electro-hydraulic cylinder.

According to one preferred embodiment:

the electro-hydraulic cylinder is disposed between the air cleaner and the air cleaner side rear wheel supporting portion.

With this arrangement, the electro-hydraulic cylinder, together with the air cleaner and a muffler, can be disposed between the right and left rear wheel supporting portions, thus being protected by these right and left rear wheel supporting portions.

According to one preferred embodiment:

the air cleaner is disposed at a rear end portion of the vehicle body; and the air cleaner includes, at its rear end portion, a cap for oil filter element replacement, the cap being disposed on more rear side of the vehicle body than the right and left rear wheel supporting portions.

With this arrangement, maintenance of the air cleaner, e.g. replacement of its oil filter element, can be effected easily, from the rear outer side of the vehicle body, without inviting such inconvenience as interference by the right and left rear wheel supporting portions, etc.

(3) Further, the following arrangements too, if added to either one of the utility work vehicles, will provide further advantages.

The utility work vehicle further comprises:

a battery; and a supporting platform receiving and supporting the battery from under;

wherein a main frame of the vehicle body frame includes a front frame portion, an intermediate frame portion and a rear frame portion;

the intermediate frame portion has a sufficient lateral width with its right and left end portions being disposed on more laterally outer sides of the vehicle body than right and left end portions of the front frame portion and right and left end portions of the rear frame portion;

the supporting platform is disposed at an end portion of the front frame portion or the rear frame portion on the side of the intermediate frame portion, with the supporting platform extending in a cantilever manner from one right/left end portion of the front frame portion or the rear frame portion toward a lateral outer side of the vehicle body;

there is provided an installing member that can be switched over between an in-use state where the installing member is installed under a downwardly oriented posture from the intermediate frame portion to an extension end portion of the supporting platform and a non-use state where the installing member is not used; and the installing member, in the non-use state, keeps open the battery on a laterally outer side of the vehicle body.

With this arrangement, one of right and left spaces adjacent the intermediate frame portion on the laterally outer side of the front frame portion or the rear frame portion obtained by a difference of lateral width between the intermediate frame portion and the front or rear frame portion can be effectively utilized for disposing the battery.

Further, as the supporting platform is mounted in a cantilever manner, the number of connecting portions of the supporting platform relative to the front frame portion or the rear frame portion can be reduced. With this, the labor required for connection of the supporting platform can be reduced, so that the supporting platform can be easily mounted to the main frame.

And, by rendering the installing member into the in-use state after supporting and fixing the battery to the supporting platform, the extension end portion of the supporting platform can be supported to the intermediate frame portion via the installing member suspended from this intermediate frame portion. As a result, the heavy battery can be supported in a stable manner by the supporting platform which is firmly supported at its both ends to the main frame.

Moreover, when a maintenance operation of the battery such as a replenishing operation of battery solution or a maintenance operation of the battery is to be carried out, the lateral outer side of the battery can be opened up by rendering the installing member into the non-use state.

With the above, a carry-out operation of the battery from the battery supporting platform or a carry-in operation of the battery to a lateral outer side of the vehicle body which is effected before or after a maintenance operation can be carried out easily with sliding the heavy battery on the supporting platform, without inviting inconvenience of the operation being obstructed by the installing member. Consequently, a maintenance operation of the battery can be easily effected.

According to one preferred embodiment:
the supporting platform includes a first raised portion raised along the right/left direction of the vehicle body at a front end portion of the supporting platform, a second raised portion raised along the right/left direction of the vehicle body at a rear end portion of the supporting platform, and a third raised portion raised along the right/left direction of the vehicle body at an inner end portion of the vehicle body.

With this arrangement, when a carry-out operation or a carry-in operation of the battery relive to the supporting platform is to be effected, the sliding movement of the battery on the supporting platform can be regulated by the respective raised portions. So that, inadvertent displacement of the battery off the supporting platform in the front/rear direction or to the inner side of the vehicle body can be avoided.

Further, the respective raised portions can be used also as a reinforcing rib for the supporting platform, so that the strength of the supporting platform which is mounted in the cantilever manner can be increased.

According to one preferred embodiment:
the intermediate frame portion includes the installing member at a portion thereof adjacent an extension end portion of the supporting platform, with the installing member being pivotally displaceable between an in-use position providing the in-use state and a non-use position providing the non-use state.

With this arrangement, it is possible to avoid loss of the installing member which could occur, in case the installing member is configured to be detachable and a detached state thereof is used as the non-use state.

According to one preferred embodiment:
the intermediate frame portion includes, at a portion thereof adjacent the extension end portion of the supporting platform, a support shaft portion for pivotally supporting the installing member and a receiving portion for receiving the installing member at its non-use position.

With this arrangement, by causing the installing member to be received by the receiving portion, the installing member can be maintained at its non-use position. With this, the open state of the laterally outer side of the battery can be maintained. Consequently, the carry-in operation and the carry-out operation of the battery to/from the supporting platform from the lateral outer side of the vehicle body can be carried out easily.

Further and other characterizing features and advantageous effects achieved thereby will become apparent upon reading the following description with reference to the accompanying drawings.

BRIEF DESCRIPTION OF THE DRAWINGS

FIG. 20 is a left side view partially in vertical section of principal portions showing a flexed state of a locking mechanism with the load-carrying platform being located at its load-carrying position, in case such locking mechanism of a manual lift type is provided in place of the electro-hydraulic cylinder, FIG. 21 is a left side view partially in vertical section of principal portions showing an extended state of the locking mechanism with the load-carrying platform being located at its dumping position, in case such locking mechanism of a manual lift type is provided in place of the electro-hydraulic cylinder.

DESCRIPTION OF THE PREFERRED EMBODIMENTS

Next, with reference to FIGS. 1-22, one embodiment of a utility work vehicle according to the present invention will be described.

Figure 1:
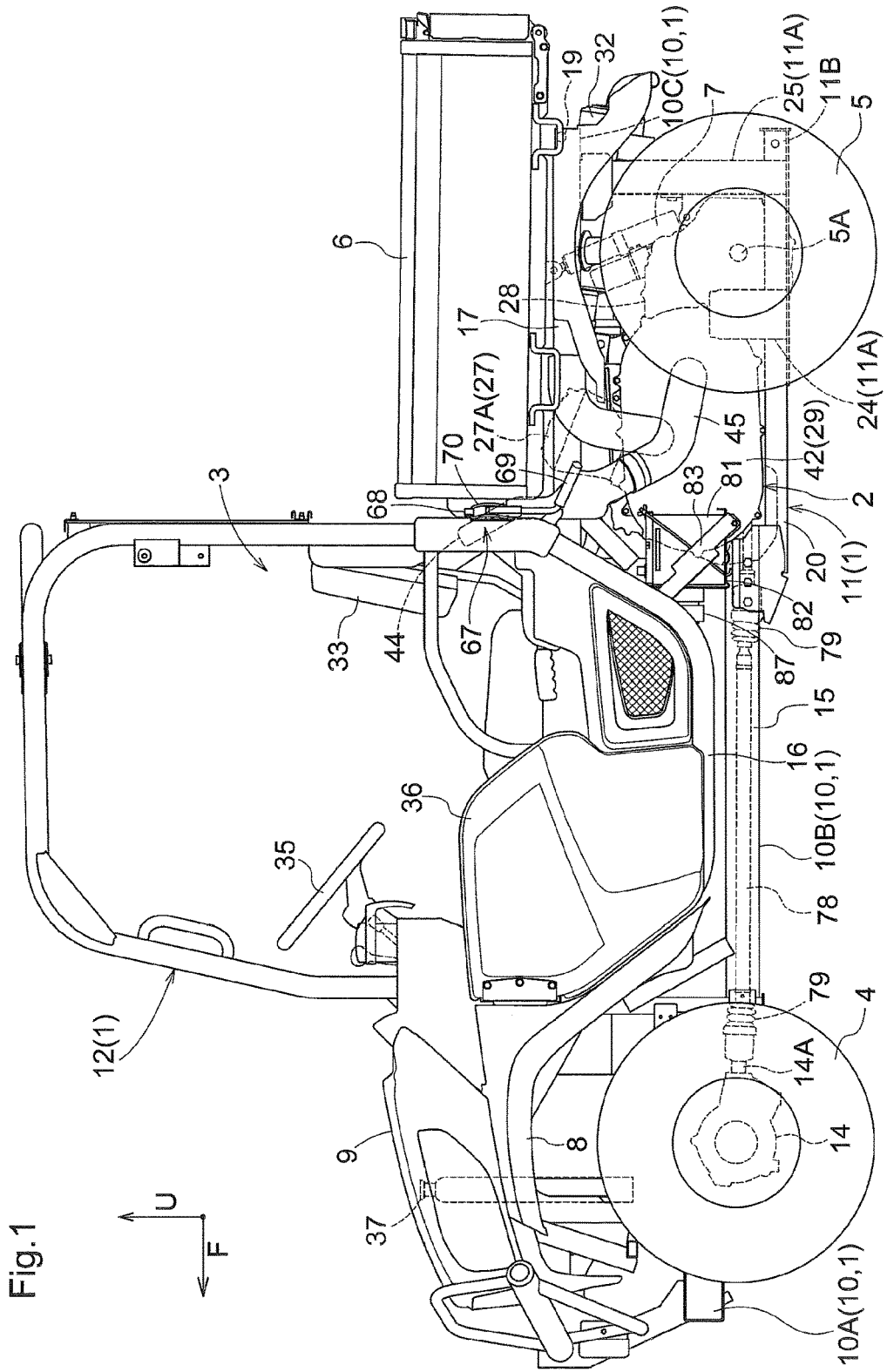
FIG. 1 is a left side view of a utility work vehicle according to one embodiment of the present invention (applied also to the drawings up to FIG. 22)

In following description, a direction denoted by an arrow of a mark "F" shown in FIG. 1 is the front side of the utility work vehicle directed to the present invention, and a direction denoted by an arrow of a mark "U" is the upper side of the utility work vehicle.

Figure 2:
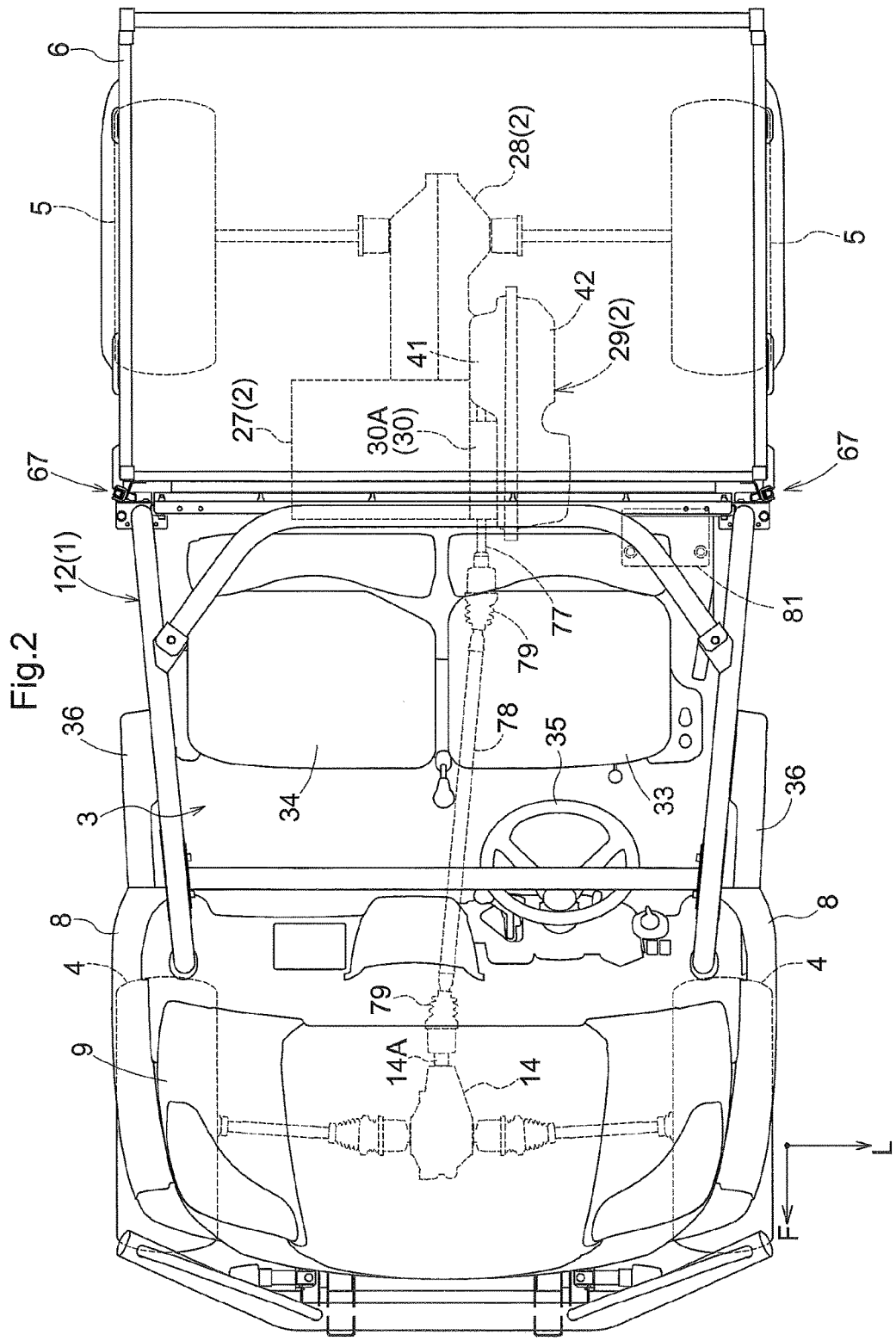
FIG. 2 is a plan view of the utility work vehicle.
Figure 3:
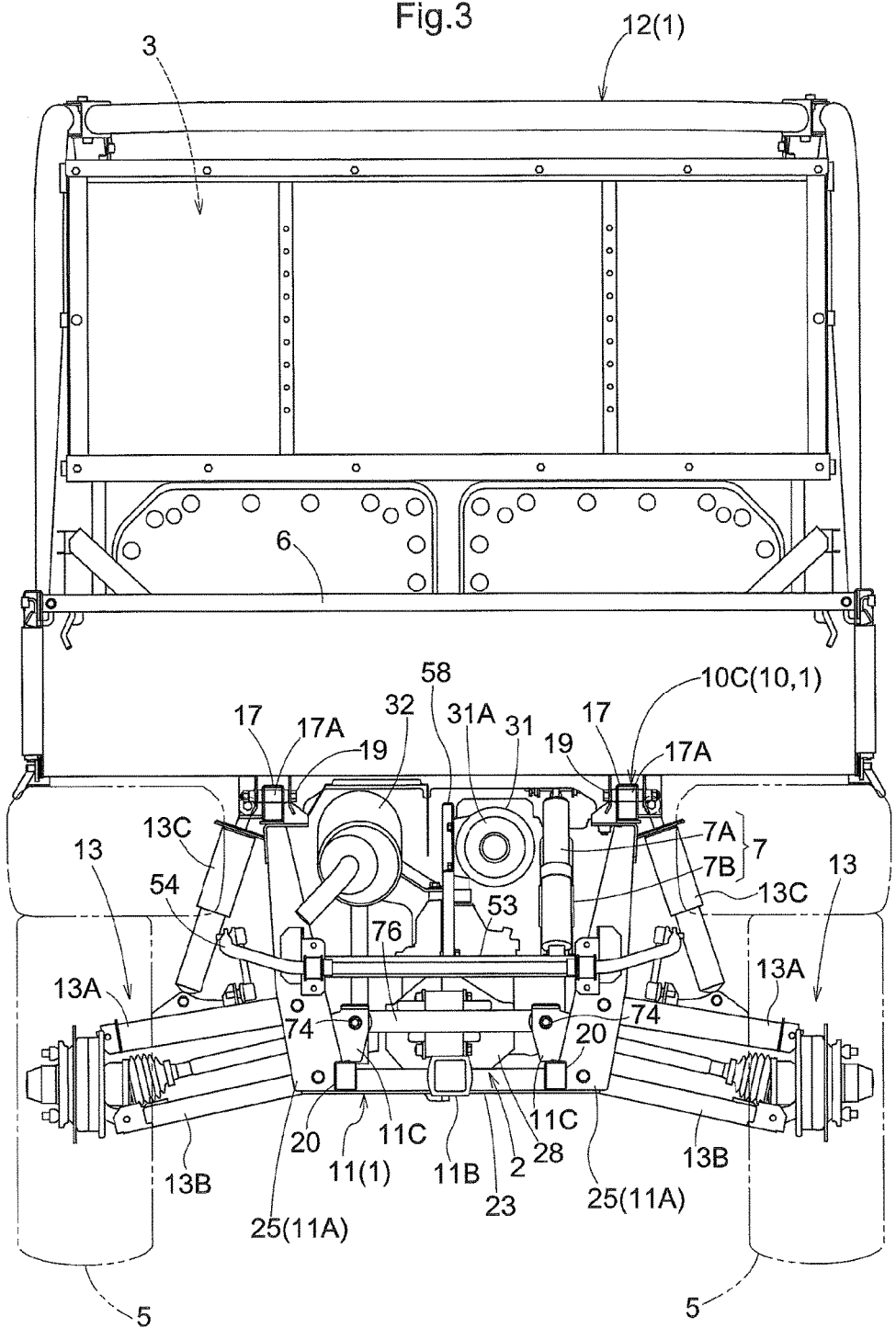
FIG. 3 is a rear view of the utility work vehicle.

Also, a direction denoted by an arrow of a mark "F" shown in FIG. 2 is the front side of the utility work vehicle directed to the present invention and a direction denoted by an arrow of a mark "L" is the left side of the utility work vehicle.

As shown in FIGS. 1-4, the utility work vehicle illustrated in the present embodiment includes: a vehicle body frame 1 forming a framework of the vehicle body; an engine section 2 mounted at a rear portion of the vehicle body; a riding section 3 for two persons mounted at a front/rear intermediate portion of the vehicle body; right and left front wheels 4 that are steerable and driven by power from the engine section 2; right and left rear wheels 5 that are driven by power from the engine section 2; a load-carrying platform 6 connected to a rear portion of the vehicle body to be liftable up/down relative thereto; an electro-hydraulic cylinder 7 for lifting up/down the load-carrying platform 6, etc. Further, the utility work vehicle includes, at front portions thereof, right and left front fenders 8, a hood 9, etc.

As shown in FIGS. 1-14, the vehicle body frame 1 includes: a main frame 10 having a front frame portion 10A, an intermediate frame portion 10B and a rear frame portion 10C; a rear frame 11 for supporting the engine section 2; and a protective frame 12 for protecting the riding section 3, and so on. And, the vehicle body frame 1 secures an accommodation space for the engine section 2, between the rear frame portion 10C of the main frame 10 and the rear frame 11.

The main frame 10, via its intermediate frame portion 10B and its rear frame portion 10C, supports the rear frame 11. The rear frame 11, via its double-wishbone type right and left rear suspensions, supports the right and left rear wheels 5.

As shown in FIG. 1 and FIG. 2, the front frame portion 10A, via its double-wishbone type right and left front suspensions (not shown), supports the right and left front wheels 4, respectively. Further, the front frame portion 10A supports a front wheel differential mechanism 14 configured to allow differential motion between the right and left front wheels 4.

As shown in FIGS. 1-12, the intermediate frame portion 10B includes right and left first side members 15 and right and left U-shaped members 16, thus forming a framework of the riding section 3 for two persons. And, the intermediate frame portion 10B has such a large lateral width that its right and left end portions are disposed on more lateral outer sides of the vehicle body than right and left end portions of the front fame portion 10A and right and left end portions of the rear frame portion 10C.

The rear frame portion 10C includes right and left second side members (right and left side members of the rear frame portion) 17, a cross member 18 interconnecting the right and left second side members 17. The right and left second side members 17 include, at their rear end portions, right and left boss portions 17A that support the load-carrying platform 6 pivotally liftably, via right and left bolts 19 functioning as right/left oriented support shafts, respectively.

As shown in FIGS. 1-14, the rear frame 11 includes: right and left side members 20 disposed at its right and left ends; a first cross member 21 interconnecting front end portions of the right and left side members 20; a second cross member 22 interconnecting front/rear intermediate portions of the right and left side members 20; a third cross member 23 interconnecting rear end portions of the right and left side members 20, and so on. And, the rear frame 11 includes right and left rear wheel supporting portions 11A for supporting the right and left rear wheels 5 via the right and left rear suspensions 13, at a rear half portion of this rear frame 11 forming the rear end portion of the vehicle body frame 1.

The right and left rear wheel supporting portions 11A include front and rear supporting members 24, 25 which extend upwards from the rear frame 11. And, the right and left rear wheel supporting members 11A support vertically pivotally, via the front and rear supporting members 24, 25, upper and lower pivot arms 13A, 13B provided in the right and left rear suspensions 13.

The right and left front supporting members 24 are connected to front/rear center portions of the right and left side members 20. With this, the right and left front supporting members 24 are disposed on more front side of the vehicle body than axles 5A of the right and left rear wheels 5. On the other hand, the right and left rear supporting members 25 are connected to rear end portions of the right and left side members 20. With this, the right and left rear supporting members 25 are disposed on more rear side of the vehicle body than the axles 5A of the right and left rear wheels 5, respectively.

The right and left front supporting members 24 have a minimum vertical length required for supporting the upper and lower pivot arms 13A, 13B. The right and left rear supporting members 25 have a vertical length extending from the rear frame 11 to the rear frame portion 10C of the main frame 10 disposed upwardly thereof. And, the right and left rear supporting members 25 support, via their lower portions, the upper and lower pivot arms 13A, 13B.

Figure 4:
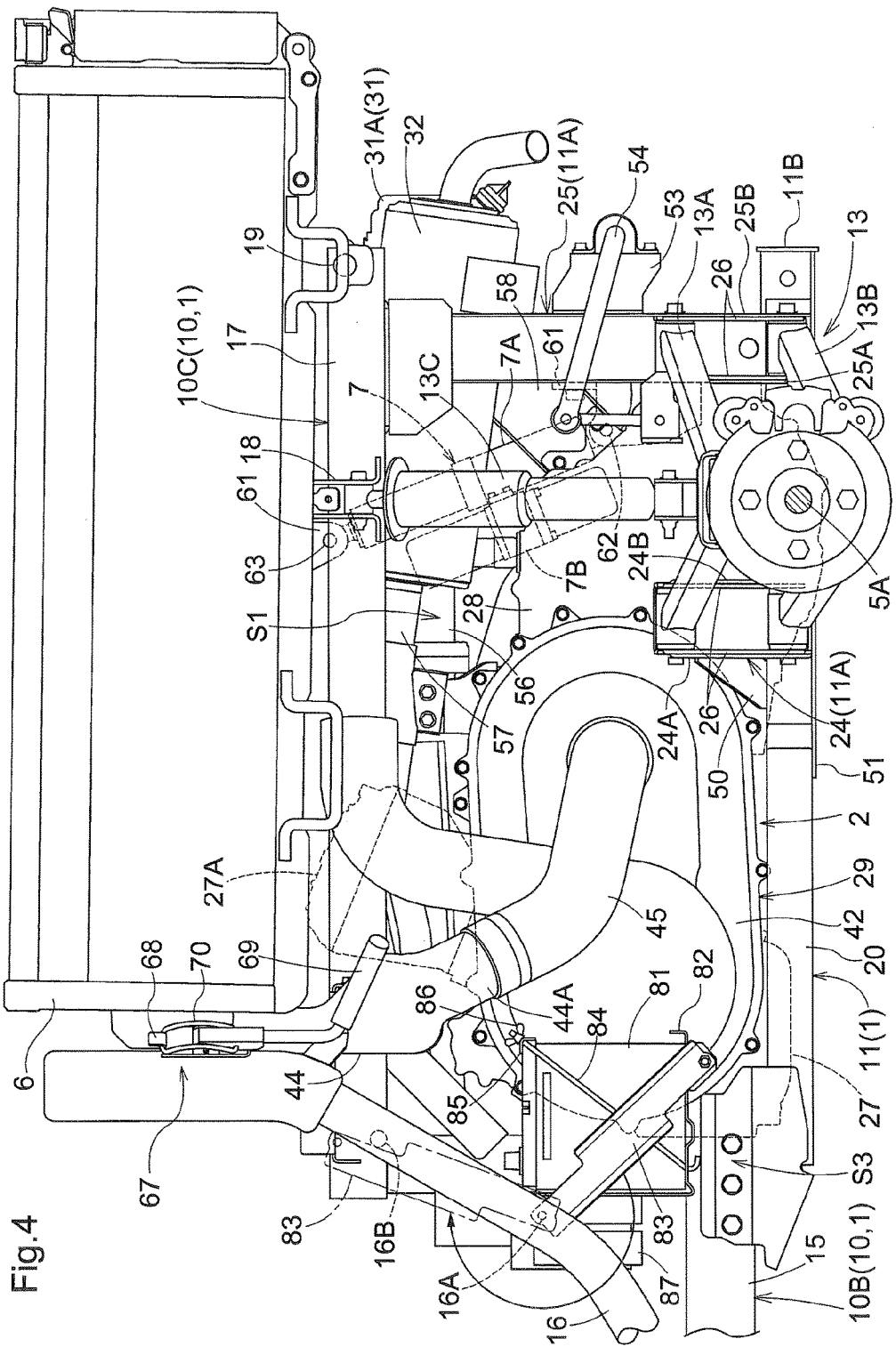
FIG. 4 is a left side view partially in vertical section showing a rear half portion of the utility work vehicle.
Figure 5:
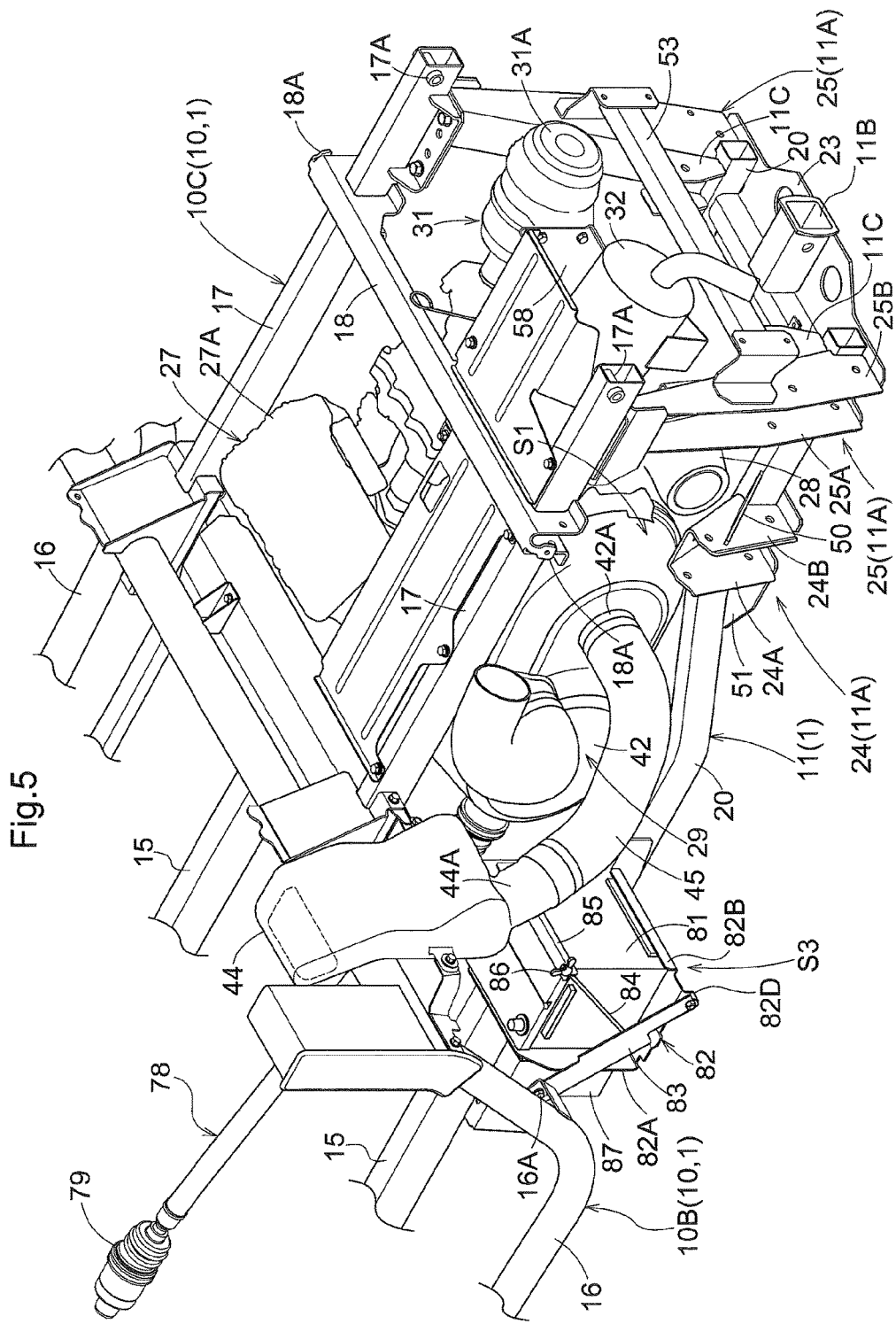
FIG. 5 is a perspective view of principal portions showing arrangements of e.g. a rear portion of a vehicle body frame and an engine section.
Figure 6:
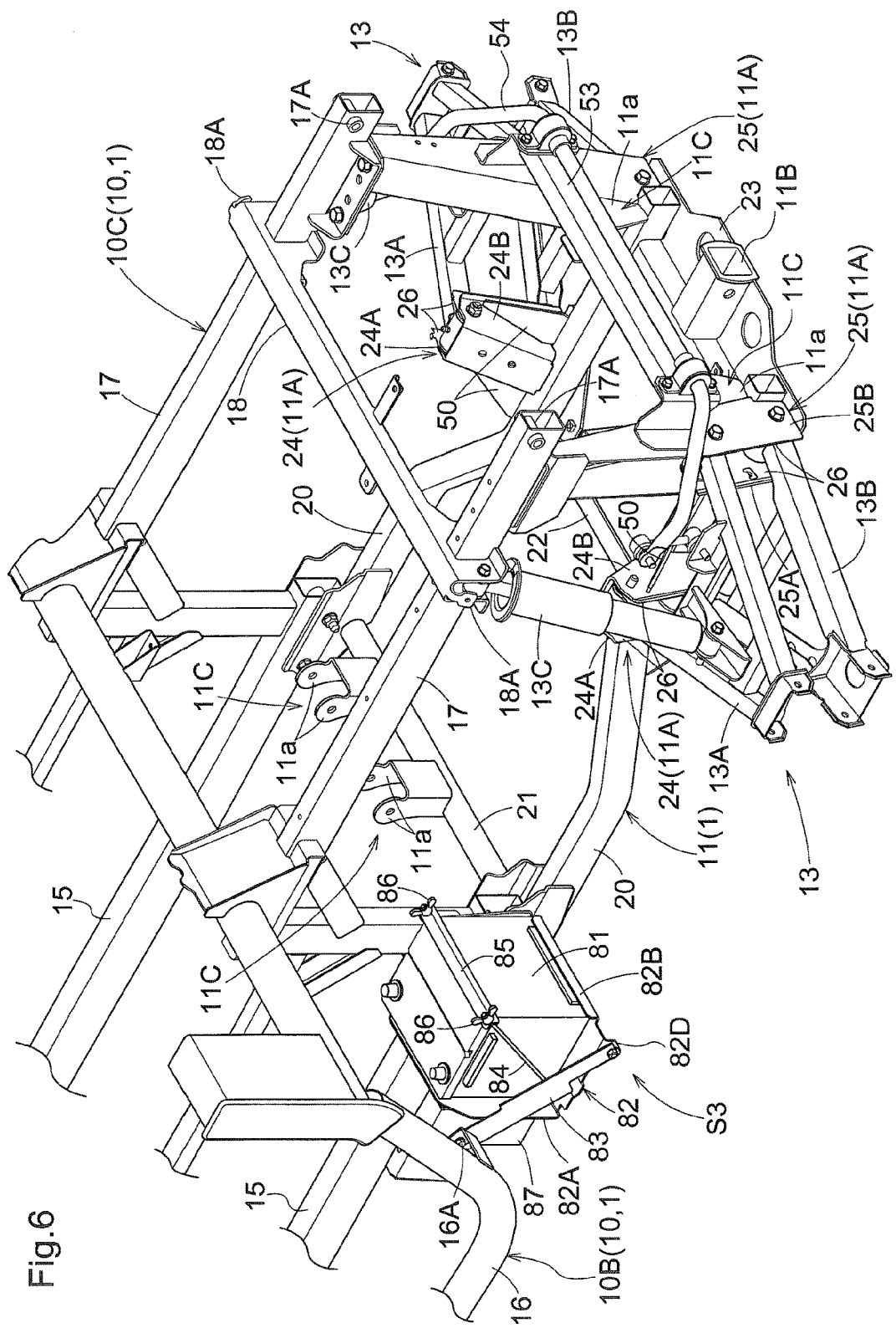
FIG. 6 is a perspective view of principal portions showing the arrangement of e.g. the rear portion of the vehicle body frame, a battery supporting arrangement.
Figure 7:
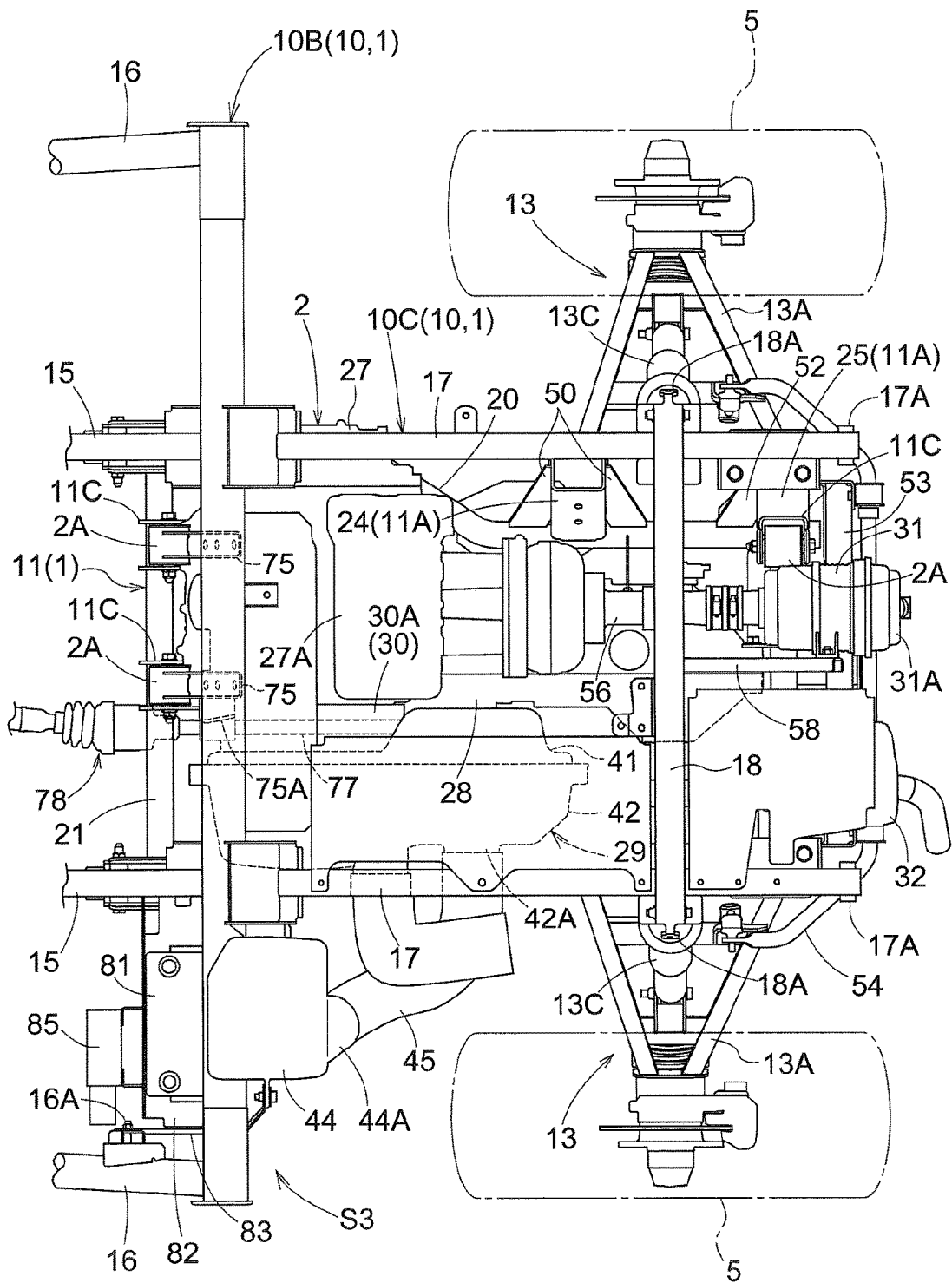
FIG. 7 is a plan view in section of a vehicle body rear portion showing arrangements of e.g. the rear portion of the vehicle body frame and the engine section.
Figure 8:
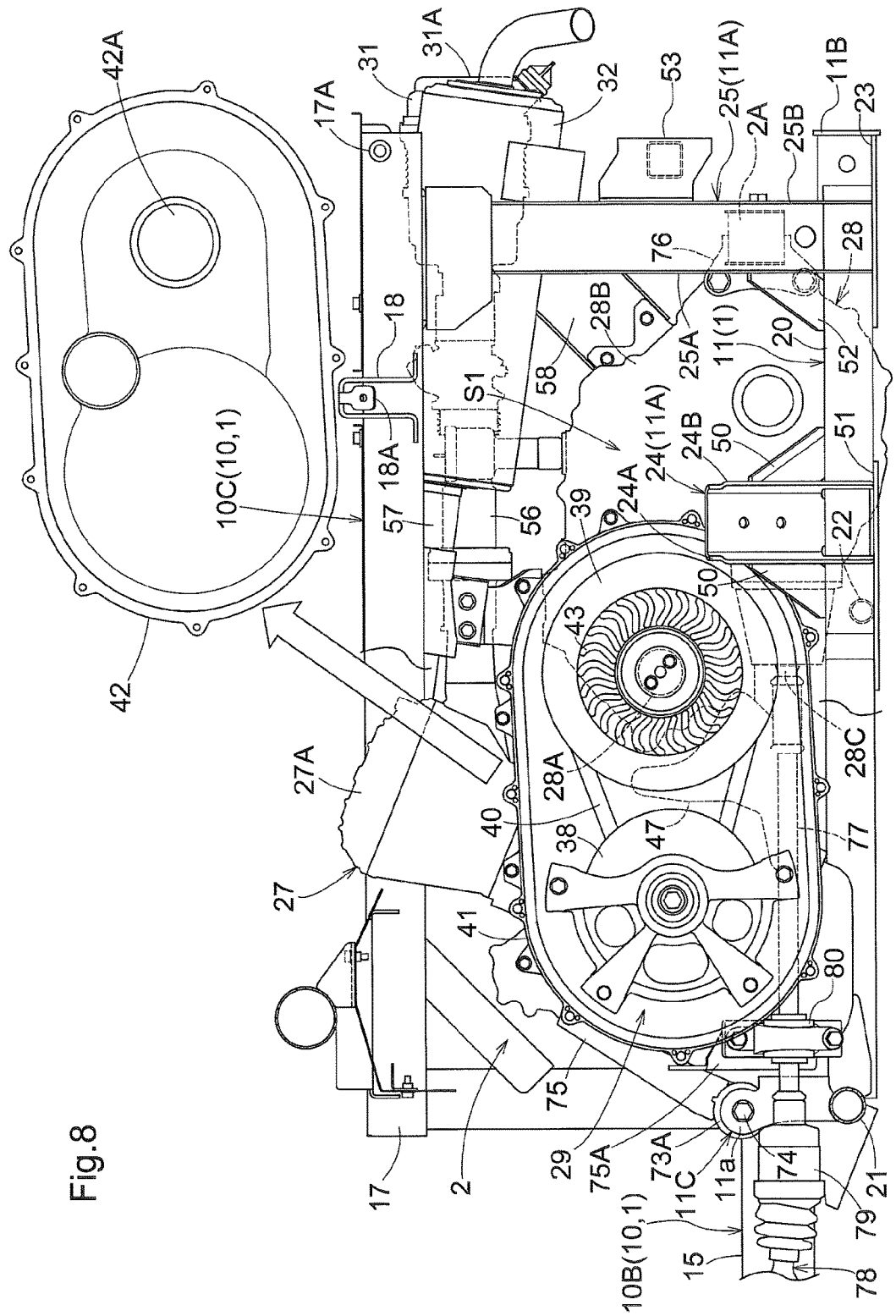
FIG. 8 is a left side view in vertical section of a vehicle body rear lower portion showing arrangements of e.g. a rear portion of the vehicle body frame, the engine section.

As shown in FIG. 4 and FIG. 6, the respective supporting members 24, 25 include front and rear anti-frictional wear plates 26 interposed between themselves and the upper and lower pivot arms 13A, 13B. With this arrangement, it is possible to reduce the possibility of frictional wear due to pivotal movements of the upper and lower pivot arms 13A, 13B, at the contact portions between the respective supporting members 24, 25 and the upper and lower pivot arms 13A, 13B.

As shown in FIG. 1 and FIGS. 3-14, the rear frame 11 connects the front end portions of the right and left side members 20 to the intermediate frame portion 10B of the main frame 10. Further, the rear frame 11 connects the upper end portions of the right and left rear supporting members 25 to the rear frame portion 10C of the main frame 10.

With the above, the rear frame 11, via its front and rear end portions, can be firmly supported at its both ends to the main frame 10. Also, as the right and left rear supporting members 25 function also as connecting members for connecting the rear end portion of the rear frame 11 to the intermediate frame portion 10B of the main frame 10, it becomes also possible to realize simplification of the configuration through reduction in the number of parts, etc.

As shown in FIGS. 1-5 and FIGS. 7-13, the engine section 2 includes: a gasoline engine (to be referred to as "engine" hereinafter) 27 having its output shaft (not shown) mounted under a laterally oriented posture along the right/left direction of the vehicle body; a speed changer device 28 having its input shaft 28A oriented laterally along the right/left direction of the vehicle body and disposed rearwardly of the engine 27; a belt type stepless speed changer device 29 disposed on the left side of the engine 27 and the speed changer device 28 and configured to transmit power from the engine 27 to the speed changer device 8; a clutch 30 interposed between the engine 27 and the belt type endless speed changer device 29, and so on. Further, the engine section 2 includes: an air cleaner 31 for filtering air to be supplied to the engine 27; a muffler 32 as an exhaust gas treating device for treating exhaust gas from the engine 27, and so on.

As shown in FIG. 1 and FIG. 2, the riding section 3 includes: a driver's seat 33 disposed on the left side; a passenger's seat 34 disposed on the right side; a steering wheel 35 operably coupled to the right and left front wheels 4 for steering them; right and left doors 36, and so on.

As shown in FIG. 1, FIG. 2, FIG. 7, FIG. 10, FIG. 11 and FIG. 15, the engine 27 is a water-cooled type, which is cooled by cooling water from a radiator 37 disposed at a front portion of the vehicle body. The clutch 30 functions as a main clutch for transmitting or non-transmitting power from the engine 27 to the belt type stepless speed changer device 29. And, the clutch 30 includes, in an outer side face of a clutch case 30A on the side of the belt type stepless speed changer device, a cooling air passage (not shown) communicated to the inside of the belt type stepless speed changer device 29.

Though not shown, the speed changer device 28 includes, inside its casing, a gear type speed changer mechanism capable of switching between forward traveling and reverse traveling and also switching in two steps of high and low in the forward and reverse traveling powers; a power distribution mechanism for dividing speed-changed power from the gear type speed changer mechanism to a front wheel driving power and a rear wheel driving power; a front wheel clutch for transmitting or non-transmitting power to the right and left front wheels 4; a rear wheel differential mechanism allowing differential motion between the right and left rear wheels 5; a differential lock mechanism for switching over the rear wheel differential mechanism between a differential motion allowing state and a differential motion inhibiting state; a brake, and so on.

As shown in FIG. 4, FIG. 5 and FIGS. 7-12 and FIG. 15, the belt type stepless speed changer device 29 includes: a drive pulley 38 rotatable together with the output shaft of the engine 27 via the clutch 30; a driven pulley 39 rotatable together with the input shaft 28A of the speed changer device 28; a transmission belt 40 for transmitting power from the drive pulley 38 to the drive pulley 39; an inner cover 41 fixed to the clutch case 30A of the clutch 30 and fixed also to the casing 28B of the speed changer device 28; an outer cover 42 detachably attached to the inner cover 41, and so on.

That is, the belt type stepless speed changer device 9 includes the outer cover 42 as a speed changer cover that can be attached and detached from the left outer side of the vehicle body. And, with detachment of the outer cover 42 from the outer side of the vehicle body, the belt type stepless speed changer device 29 can expose the drive pulley 38 and the drive pulley 39 to the outside. As a result, a maintenance operation of the belt type stepless speed changer device 29, such as replacement of the transmission belt 40, can be effected from the left outer side of the vehicle body.

As shown in FIG. 1, FIG. 4, FIG. 5, FIGS. 7-12 and FIG. 15, the belt type stepless speed changer device 29 includes a suction fan 43 rotatable together with the driven pulley 39. The outer cover 42 includes an air intake portion 42A at a portion facing the suction fan 43. And, this air intake portion 42A is connected via an air intake pipe 45 to a cooling air cleaner 44 mounted between the riding section 3 and the load-carrying platform 6. The inner cover 41 includes an opening (not shown) which communicates the inside of the belt type stepless speed changer device 29 to the air passage of the clutch case 30A. The clutch case 30A includes an exhaust portion 30B at its front end portion. And, exhaust gas from this exhaust portion 30B is supplied to the lower portion of the engine 37 via an exhaust pipe 46 connected to the exhaust portion 30B.

With the above arrangement, under the transmitting state of the clutch 30 in which the belt type stepless speed changer device 29 is operable, by a suction function of the suction fan 43, ambient air present between the riding section 3 and the load-carrying platform 6 can be introduced to the inside of the belt type stepless speed changer device 29 via the air cleaner 44, etc. And, after causing the introduced ambient air to flow as cooling air from the driven pulley side to the drive pulley side of the belt type stepless speed changer device 29, this air can be supplied to the lower portion of the engine 27 via the air passage of the clutch case 30A, etc. As a result, the belt type stepless speed changer device 29, the clutch 30, and the engine 27 can be cooled in an efficient manner.

As shown in FIG. 1, FIG. 4, FIG. 5, FIGS. 7-10 and FIG. 13, the engine section 2 includes the aforementioned laterally disposed engine 27 under a rearwardly inclined posture with its cylinder head 27A being located on more rear side of the vehicle body than the output shaft. And, the speed changer device 28 is connected to the lower portion of the engine 27 via three connecting plates 47.

Namely, as the laterally disposed engine 27 is mounted under the rearwardly inclined posture, it is possible to reduce the total height of the engine 27 while maintaining the output shaft under a horizontal posture. So that, the total height of the engine section 2 can be reduced. And, under the rearwardly inclined posture of the engine 27, the cylinder head 27A is disposed on the side of the speed changer device. With this, as compared with an arrangement of mounting the engine 27 under a forwardly inclined posture with its cylinder head 27A being disposed on the side opposite the speed changer device, the total length of the engine section 2 can be made smaller. Consequently, compacting the engine section 2 is made possible.

As shown in FIG. 1 and FIGS. 3-14, the rear frame 11 includes the aforementioned rear wheel supporting portions 11A on the right and left end portions of the rear frame 11 disposed on more laterally outer side of the vehicle body than the engine section 2. And, of the front and rear right/left supporting members 24, 25 belonging in the right and left rear wheel supporting portion 11A, the right and left rear supporting members 25 are disposed on more rear side of the vehicle body than the belt type stepless speed changer device 29 in such a manner that the lower end portions of these right and left supporting members 25 are connected to the rear end portions of the right and left side members 20 and the upper end portions of these right and left supporting members 25 are connected to the right and left second side members 17 of the rear frame portion 10C.

That is, the right and left supporting members 25 function also as right and left connecting members that connect the rear frame 11 to the rear frame portion 10C of the main frame 10. With this arrangement, as compared with an arrangement of providing separate connecting members, it is possible to simplify the arrangement through reduction in the number of parts.

On the other hand, of the front and rear right/left supporting members 24, 25, the right and left front supporting members 24 are disposed on laterally outer side of the vehicle body relative to the engine section 2 by connecting lower end portions of these right and left front supporting members 24 to rear portions of the right and left side members 20. And, the right and left front supporting members 24 have a smaller vertical length than the right and left rear supporting members 25, thus forming a maintenance space S1 between the upper ends of the respective front supporting members 24 and the rear frame portion 10C of the main frame 10.

More particularly, the left front supporting member 24 is disposed on the left outer side of the vehicle body relative to the belt type stepless speed changer device 29 and has a smaller vertical length than the rear supporting member 25, thus forming, between its upper end and the rear frame portion 10C of the main frame 10, the space S1 that allows attachment/detachment of the outer cover 42 detachably provided in the belt type stepless speed changer device 29, from the left outer side of the vehicle body.

With this, when maintenance operation of the belt type stepless speed changer device 29 is to be effected, detachment of the outer cover 42, replacement of the transmission belt 40, etc. can be readily effected from the left outer side of the vehicle body, without inviting inconvenience of the operation being interfered by the presence of the left front supporting member 24.

On the other hand, the right front supporting member 24 is disposed on the right outer side of the vehicle body relative to the speed changer device 28 and has a smaller vertical length than the rear supporting member 25, thus forming, between its upper end and the rear frame portion 10C of the main frame 10, the space S1 that facilitates maintenance from the right outer side of the vehicle body of a speed changer operation line 48 for gear speed change, a rear wheel differential lock operational line 49, etc. provided on the right outer side of the speed changer device 28.

With this arrangement, a maintenance operation for the gear speed change speed changer operational line 48, the rear wheel differential lock operational line 49 on the speed changer device side, such as length adjustment of control cables 48A, 48A, etc. can be effected easily from the right outer side of the vehicle body, without inviting inconvenience of the operation being interfered by the presence of the right front supporting member 24.

Figure 9:
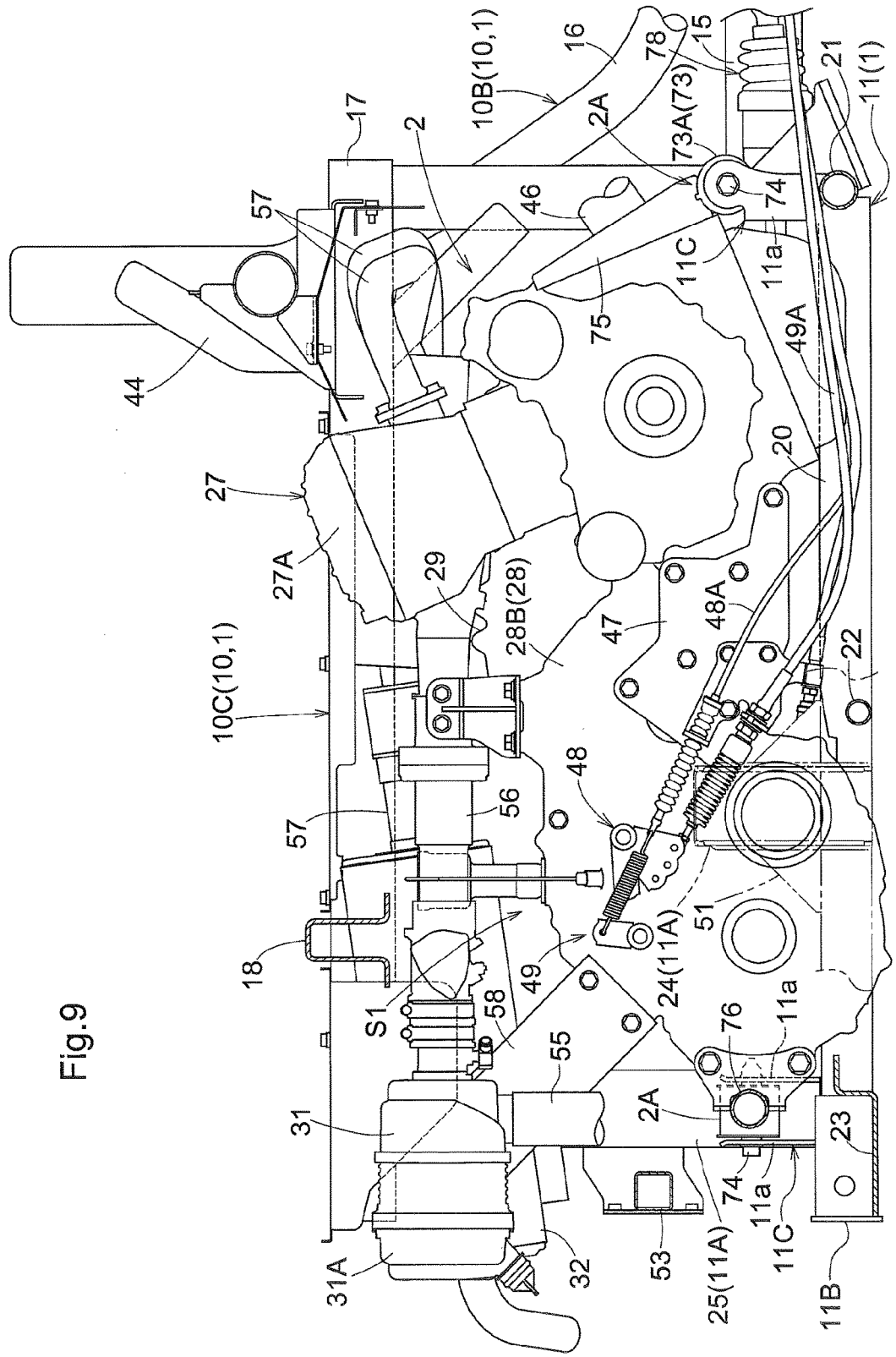
FIG. 9 is a right side view in vertical section of a vehicle body rear lower portion showing arrangements of e.g. a rear portion of the vehicle body frame, the engine section.
Figure 10:
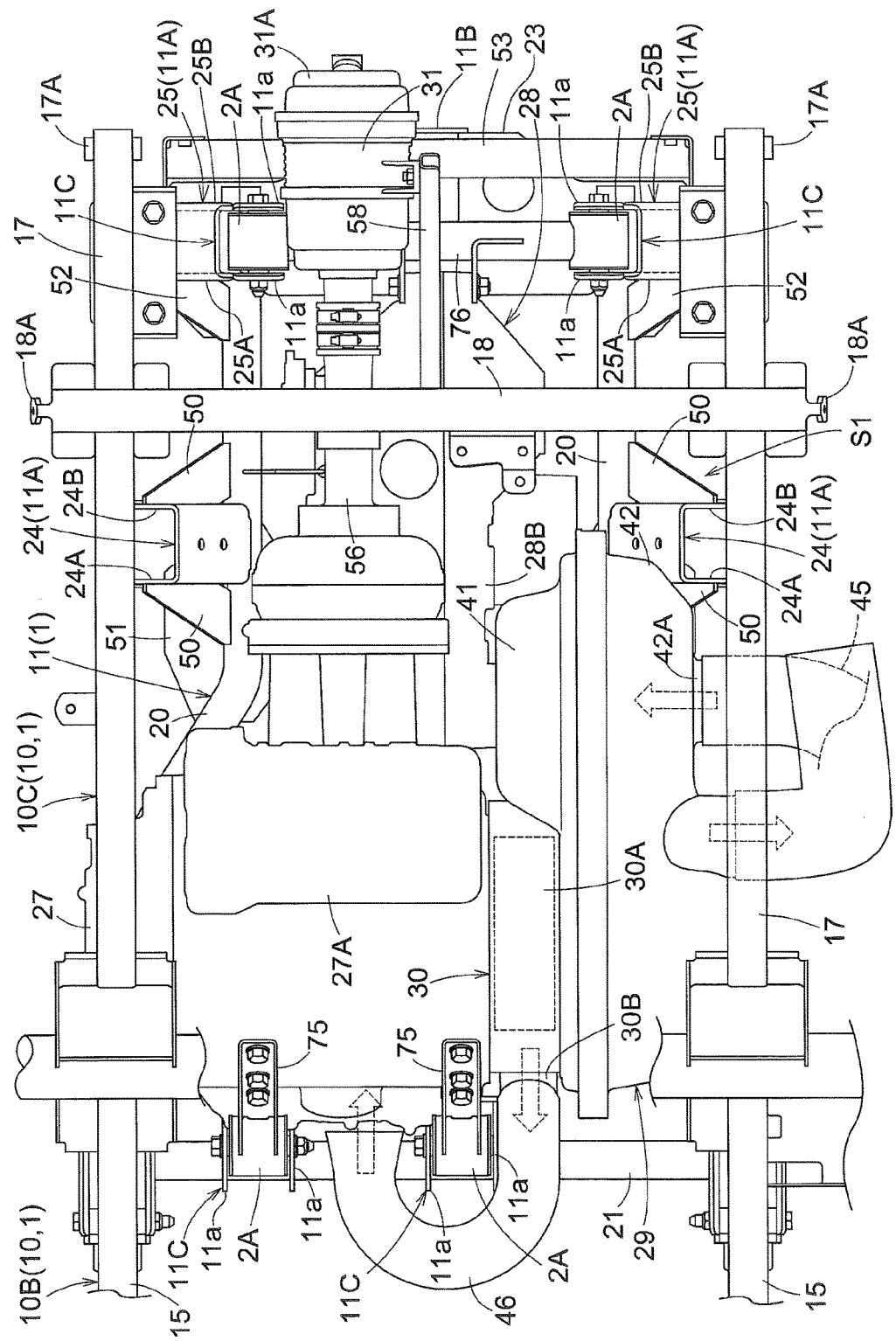
FIG. 10 is a plan view in section of principal portions showing arrangements of e.g. a rear portion of a vehicle body frame and an engine section.
Figure 11:
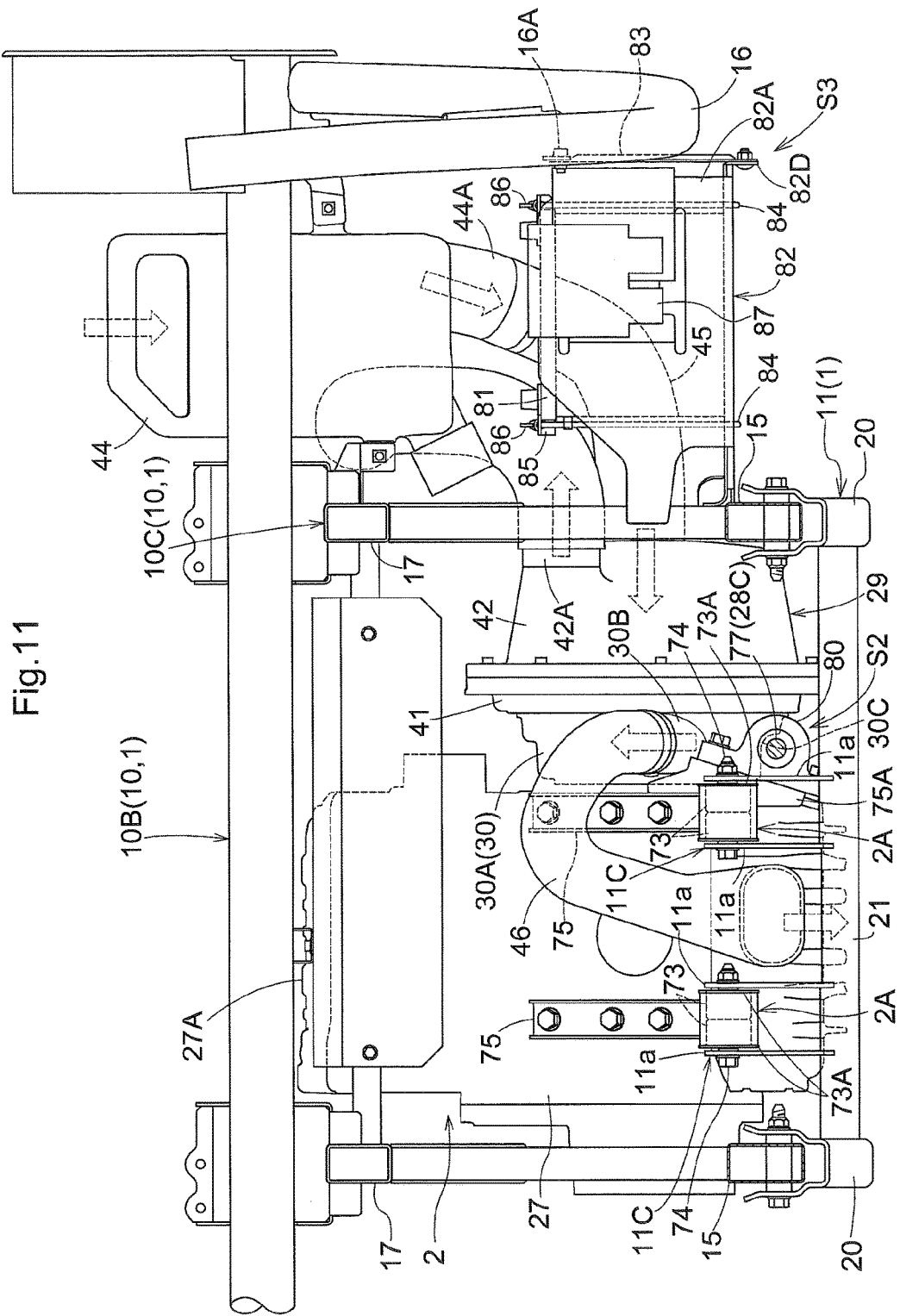
FIG. 11 is a front view in section of principal portions showing arrangements of e.g. a rear portion of a vehicle body frame and an engine section.

As shown in FIG. 9, the gear speed change control cable 48A and the rear wheel differential lock control cable 49A, etc. are arranged to extend past above the first cross member 21 between the engine section 2 and the riding section 3.

Figure 16:
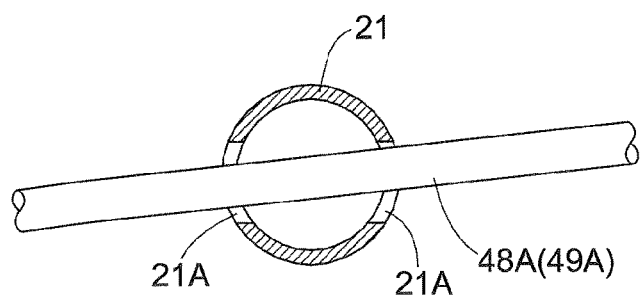
FIG. 16 is a left side view in vertical section of principal portions showing another mode of layout of a control cable in which the control cable extends through a through hole of a first cross member.
Figure 17:
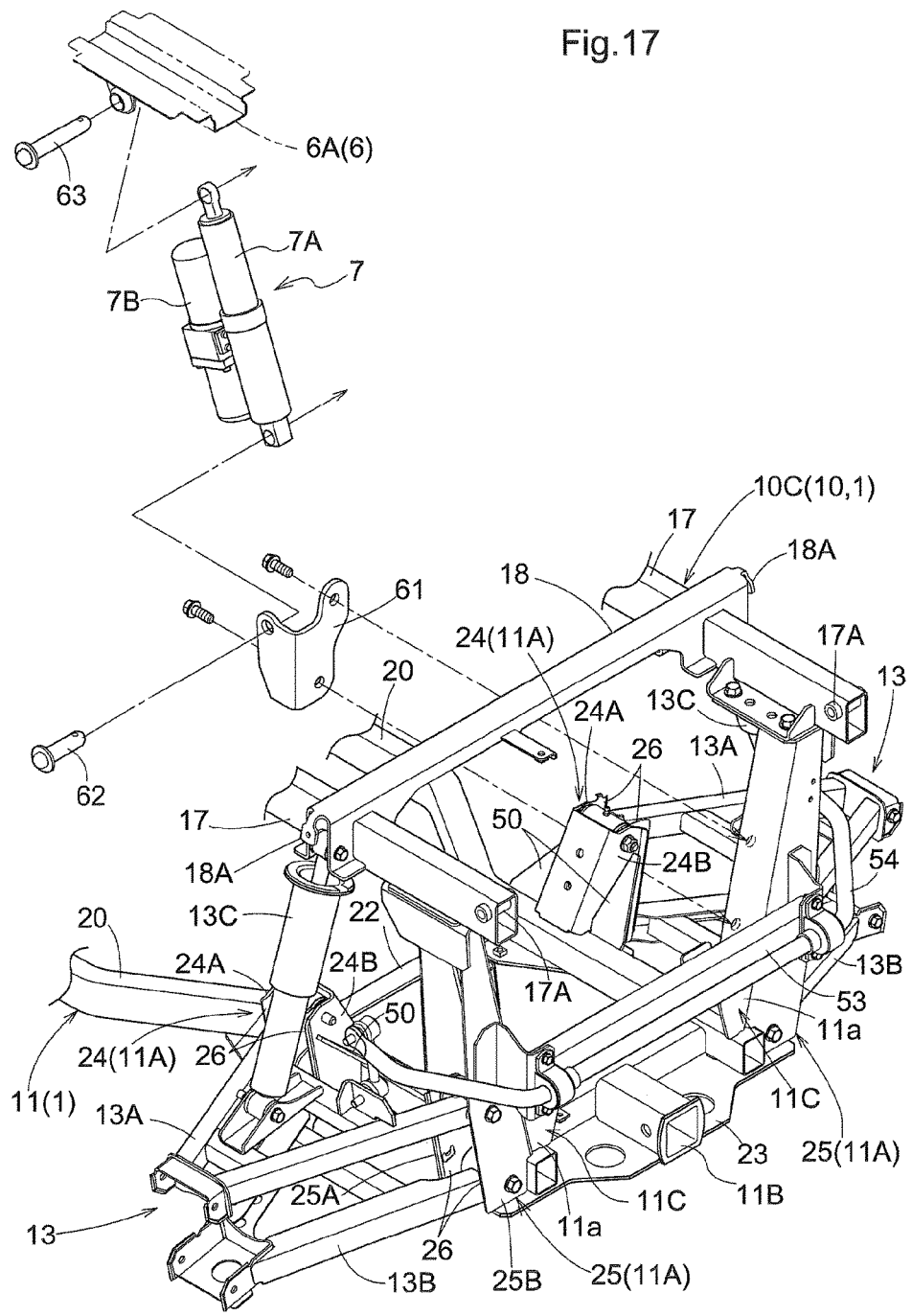
FIG. 17 is a partially exploded perspective view of principal portions showing e.g. a support arrangement of an electro-hydraulic cylinder.
Figure 18:
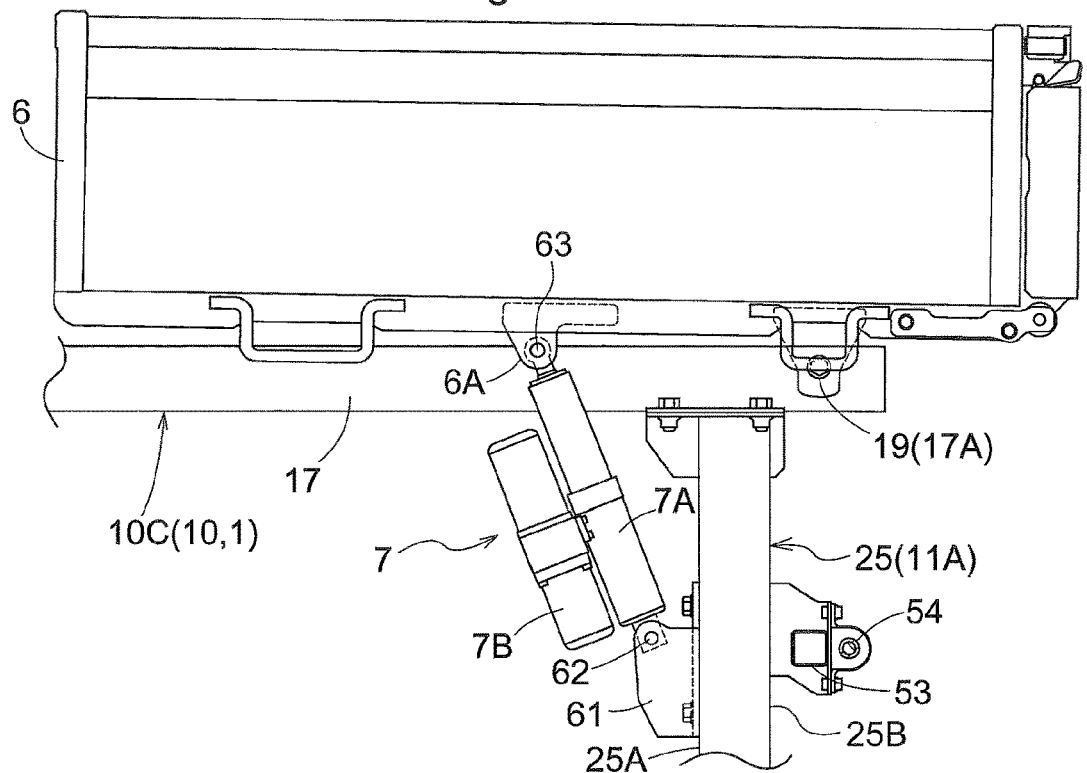
FIG. 18 is a left side view partially in vertical section of principal portions showing a contracted state of the electro-hydraulic cylinder, with a load-carrying platform being located at its load-carrying position.
Figure 19:
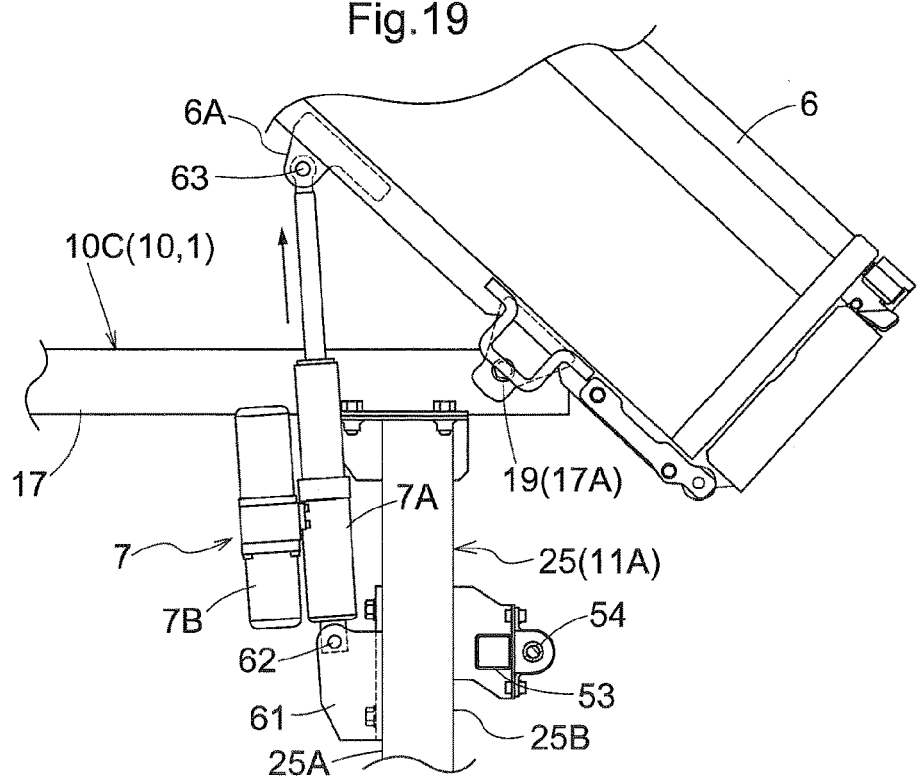
FIG. 19 is a left side view partially in vertical section of principal portions showing an extended state of the electro-hydraulic cylinder, with the load-carrying platform being located at its dumping position.
Figure 22:
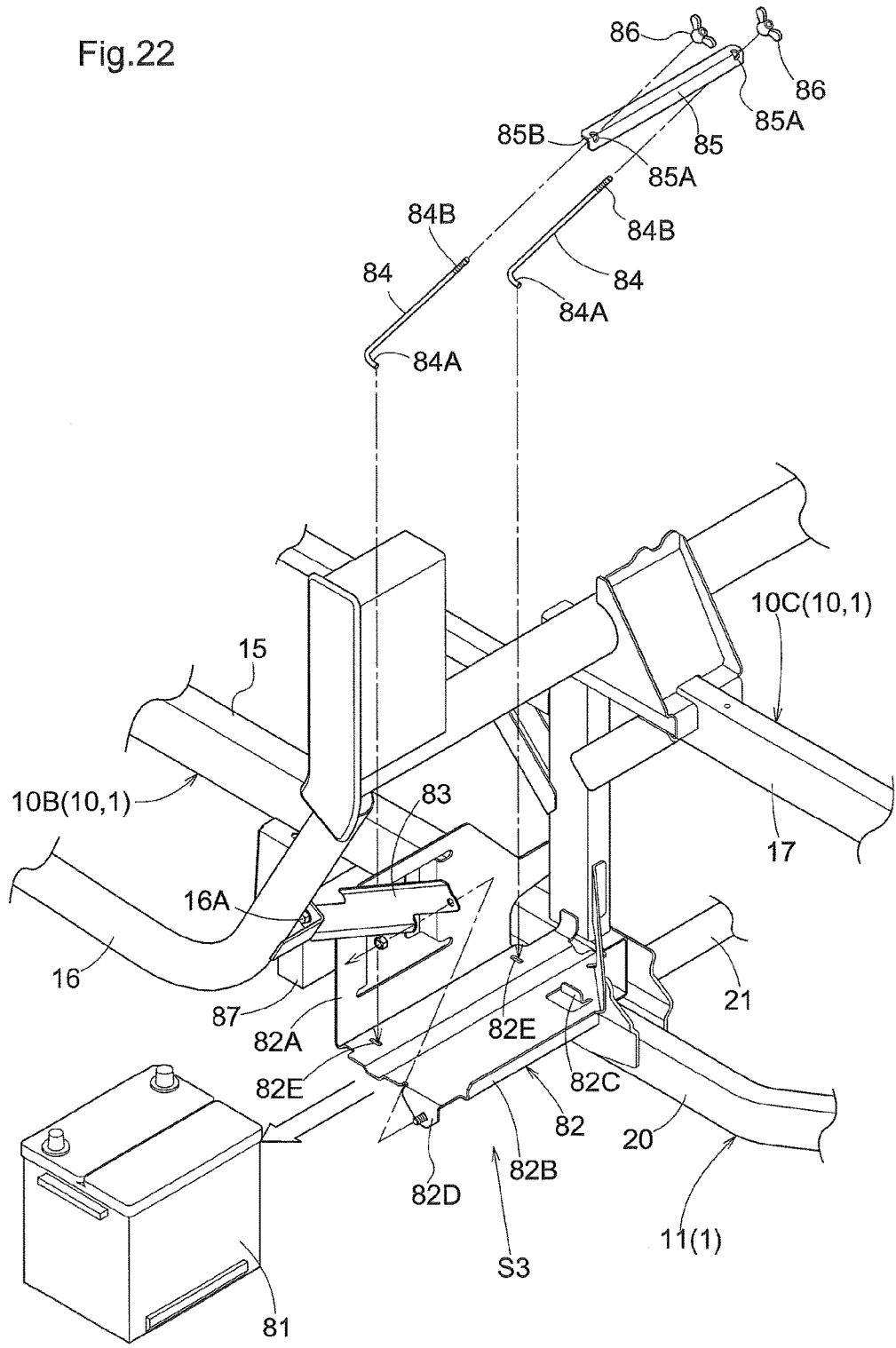
FIG. 22 is a partially exploded perspective view of principal portions showing a battery supporting arrangement.

Incidentally, as shown in FIG. 16, the first cross member 21 may be provided with a plurality of through holes 21A oriented in the front/rear direction, such that the gear speed change control cable 48A and the rear wheel differential lock control cable 49A, etc. may extend between the engine section 2 and the riding section 3 through the respective through holes 21A of the first cross member 21.

As shown in FIG. 5, FIG. 7, FIG. 11 and FIG. 12, the cooling air cleaner 44 is disposed at a position which is on more left outer side of the vehicle body than the rear frame portion 10C and which also is on more upper side of the vehicle body than the belt type stepless speed changer device 29. And, this cooling air cleaner 44 includes, at its left portion of its lower end portion, a connecting portion 44A to be connected to the air intake pipe 45.

With the above arrangement, when detachment/attachment of the outer cover 42, replacement of the transmission belt 40, etc. is to be effected with utilizing the left side space S1, inconvenience of this operation being interfered by the presence of the cooling air cleaner 44 can be avoided.

As shown in FIGS. 3-10, FIG. 12, FIG. 13 and FIG. 14, the rear frame 11 includes a connecting portion 11B for towing at right/left intermediate portion of the third cross member 23. Further, as reinforcing members for reinforcing its rear portion, the rear frame 11 includes: right and left first reinforcing members 50 between the side members 20 and the front supporting members 24 on the front and rear sides of the right and left front supporting members 24; right and left second reinforcing members 51 between the side members 20, the front supporting members 24 and the second cross member 22, at the bottom portion of the rear frame 11; right and left third reinforcing members 52 between the side members 20 and the rear supporting members 25, on the front sides of the right and left rear supporting members 25; a fourth reinforcing member 53 between the right and left supporting members 25 on the rear side of the rear frame 11, and so on. The respective front and rear right/left supporting members 24, 25 are provided in U-shape in the plan view having opposed front and rear vertical walls 24A, 24B, 25A, 25B, thus being provided with high strength.

With the above arrangement, while there is employed the frame arrangement of not connecting the right and left front supporting members 24 to the rear frame portion 10C of the main frame 10 in order to obtain the aforementioned maintenance space S1, high strength capable of ensuring a towing work or the like can be ensured at the rear portion of the vehicle body frame 1.

As shown in FIG. 3, FIG. 4, FIG. 6 and FIG. 7, the fourth reinforcing member 53 functions also as a supporting member for supporting a stabilizer 54 extending between the right and left rear suspensions 13. With this arrangement, as compared with an arrangement of providing a separate supporting member, it is possible to e.g. simplify the arrangement through reduction in the number of parts.

As shown in FIGS. 3-5, FIGS. 7-10 and FIG. 12, the air cleaner 31 filters air from the accommodation space on the front side of the vehicle body supplied via the first air intake pipe 55 and supplies this filtered air to the engine 27 via a second air intake pipe 56 extending above the speed changer device 28. The muffler 32 discharges exhaust gas from the engine 27 fed via an exhaust pipe 57 extending above the belt type stepless speed changer device 29 to the rear side of the vehicle body.

Referring to the air cleaner 31 and the muffler 32, the air cleaner 31 is disposed on the right side and the muffler 32 is disposed on the left side and these are disposed side by side on the right and left sides at positions more upward than the speed changer device 28 between the right and left rear wheel supporting portions 11A. And, a supporting member 58 for supporting the air cleaner 31 is disposed between the air cleaner 31 and the muffler 32.

With the above arrangement, it is possible to cause the air cleaner supporting member 58 to function also as a heat shielding plate for restricting heat discharged from the muffler 32 from reaching the air cleaner 31.

The air cleaner supporting member 58 is connected to the speed changer device 28 under a rearwardly inclined posture extending rearwardly and upwardly from a rear upper portion of the speed changer device 28. And, this air cleaner supporting member 58 supports the air cleaner 31, via its extending end portion.

The air cleaner 31 is mounted at a rear portion of the vehicle body, with its oil filter element replacement cap 31A being disposed at the rear end portion of the air cleaner 31 and with this cap 31A being disposed more rear side of the vehicle body than the right and left rear wheel supporting portions 11A.

With the above arrangement, a maintenance operation of the air cleaner such as oil filter element replacement, can be effected easily from the rear outer side of the vehicle body, without inviting inconvenience of the operation being obstructed by the presence of the right and left rear wheel supporting portions 11A, etc.

As shown in FIG. 9, the engine 27 has its aforementioned rearwardly inclined posture set such that its exhaust side to which the exhaust pipe 57 is connected is oriented upwards.

With this arrangement, as compared with an arrangement of the rearwardly inclined posture of the engine 27 being set to a posture of its exhaust side being oriented downwards, it becomes easier to pass the exhaust pipe 57 above the belt type stepless speed changer device 29, so that the exhaust pipe 57 can be connected without difficulty to the muffler 32 which is disposed at a position more upward than the speed changer device 28.

As shown in FIG. 1, FIG. 3, FIG. 4, FIG. 12 and FIGS. 17-19, the electro-hydraulic cylinder 7 integrally includes an operational unit 7B at a lateral portion of the hydraulic cylinder 7A. Though not shown, the operational unit 7B integrally includes a hydraulic pump, an electric motor for driving the hydraulic pump, a valve unit for switching over oil flow, an oil tank, and so on. And, the electro-hydraulic cylinder 7 drives to lift up/down the load-carrying platform 6 between a load-carrying position where the platform 6 assumes a horizontal posture and a dumping position where the platform 6 is forwardly raised, in association with activations of the valve unit and the hydraulic cylinder 7A by an amount of oil supplied by the hydraulic pump and present therein. Therefore, in comparison with an arrangement wherein a hydraulic pump operated by power from the engine 27 is provided for activating a platform lifting hydraulic cylinder with utilization of oil present inside a speed changer device, it is possible to simplify the arrangement and to facilitate the assembly, and also to increase the degree of freedom in layout. The electric motor is operated in response to a manual operation on an operational tool (not shown) for lifting, such as a switch or a lever provided in the riding section 3.

As shown in FIG. 3, FIG. 4 and FIGS. 17-19, the vehicle body frame 1 supports the electro-hydraulic cylinder 7 by the right rear wheel supporting portion 11A adjacent the air cleaner 31, of the right and left rear wheel supporting portions 11A disposed at the rear end portion thereof. And, by this supporting arrangement, the electro-hydraulic cylinder 7 is mounted between the air cleaner 31 and the right rear wheel supporting portion 11A.

With the above arrangement, assembly and maintenance of the electro-hydraulic cylinder 7 can be easily effected from the rear outer side of the vehicle body. Further, as the right and left rear wheel supporting portions 11A have high strength originally, the electro-hydraulic cylinder 7 can be supported with high supporting strength, without providing special supporting member therefor. As a result, it is possible to simply the arrangement of the vehicle body frame 1 supporting the electro-hydraulic cylinder 7, etc.

And, the electro-hydraulic cylinder 7 which is vulnerable to temperature influence can be disposed between the right and left rear wheel supporting portions 11A together with the air cleaner 31 and the muffler 32, yet can be disposed at a position away from the muffler 32 whose temperature rises. Consequently, it is possible to stabilize the speed of lifting of the load-carrying platform 6 by the electro-hydraulic cylinder 7, in spite of the use of the frame arrangement of protecting the electrically driven cylinder 7 together with the air cleaner 31 and the muffler 32 by the right and left rear wheel supporting portions 11A, etc.

The right rear wheel supporting portion 11A includes a bracket 61 having L-shape in the plan view provided in a front side vertical wall 25A of the rear supporting member 25. Referring to the electro-hydraulic cylinder 7, a cylinder tube side end portion of the hydraulic cylinder 7A is connected to the bracket 61 via a first connecting pin 62 oriented along the right/left direction. Further, in this electro-hydraulic cylinder 7, a piston rod side end portion of the hydraulic cylinder 7A is connected to a connecting portion 6A provided at the bottom portion of the load-carrying platform 6 via a second connecting pin 63 oriented along the right/left direction.

Namely, the rear supporting member 25 functions also as a supporting member for the electro-hydraulic cylinder 7. With this arrangement, in comparison with an arrangement of the front supporting member 24 functioning also as the supporting member for the electro-hydraulic cylinder 7, it is possible to facilitate the assembly and maintenance of the electro-hydraulic cylinder 7 from the rear outer side of the vehicle body.

As shown in FIG. 20 and FIG. 21, the utility work vehicle can include additionally a locking mechanism 64 for fixedly retaining the load-carrying platform 6 at its upwardly lifted dumping position. Namely, in this utility work vehicle, its lifting arrangement for the load-carrying platform 6 can be changed between a hydraulic lifting mode of lifting the load-carrying platform 6 by an activation of the electro-hydraulic cylinder 7 and a manual lifting mode of manually lifting up/down the load-carrying platform 6.

The locking mechanism 64 is a flexible type link mechanism having a first link 64A and a second link 64B which are flexibly connected to each other via a connecting pin 64C oriented along the right/left direction. And, in this locking mechanism 64, a first link side end portion thereof is connected to a right/left oriented first support shaft 65 attached to a left side face which forms the inner face of the right second side member 17, and a second link side end portion thereof is connected to a right/left oriented second support shaft 66 attached to the bottom portion of the load-carrying platform 6. With this, the locking mechanism 64 can be provided in the utility work vehicle under an appropriate state of the respective links 64A, 64B when extended, but not extending into the accommodation space for the engine section. Also, in this locking mechanism 64, at a first link side end portion of the second link 64B, there is provided a stopper 64D which comes into contact with the first link 64B from the front upper side thereof under its extended state.

With the above arrangement in operation, in the manual lifting mode, when the load-carrying platform 6 is pivotally lifted up from the load-carrying position to the dumping position, in operative association with this upward pivotal motion, the locking mechanism 64 can be switched over from the flexed state where the connecting pin 64C is disposed on the front side of the vehicle body to the extended state where the connecting pin 64C is disposed on the rear side of the vehicle body. Then, when the load-carrying platform 6 reaches the dumping position, the stopper 64D of the second link 64B comes into contact with the first link 64A from its upper side, whereby the locking mechanism 64 can be maintained under its extended state of providing a propping action to the load-carrying platform 6 at its dumping position. As a result, the load-carrying platform 6 can be fixedly maintained at this dumping position.

And, in the case of downwardly pivoting this load-carrying platform 6 fixedly maintained at its dumping position as described above to its load-carrying position, as the load-carrying platform 6 is pivotally lowered progressively in association with a movement of the connecting pin 64C to the front side of the vehicle body, in association with this pivotal lowing movement, the locking mechanism 64 can be switched from the extended state to the flexed state, so that the load-carrying platform 6 can be pivotally lowered from the dumping position to the load-carrying position. And, under the state of the load-carrying platform 6 being located at the load-carrying position, the locking mechanism 64 can be located under the flexed state at the position more upward than the lower end of the second side member 17.

As shown in FIG. 1, FIG. 2 and FIG. 4, the utility work vehicle includes right and left locking mechanisms 67 for locking the load-carrying platform 6 at the load-carrying position. The right and left locking mechanisms 67 are configured as a toggle type arrangement having: hook members 68 disposed at right and left end portions of the front end portion of the load-carrying platform 6; lock levers 69 disposed at right and left end portions of the rear end portion of the intermediate frame portion 10B; frame members 70 provided in the respective lock levers 69 to be hooked to the hook members 68, and so on.

With the above arrangement, under the state of the load-carrying platform 6 being located at the load-carrying position, by hooking the frame members 70 to the hook members 68 and then pivoting the lock levers 69 downwards, the right and left locking mechanisms 67 can switch to the locking state of locking the load-carrying platform 6 at its load-carrying position.

Further, under the locking state, by pivoting the lock levers 69 upwards and then releasing the frame members 70 from the hook members 68, the right and left locking mechanisms 67 can switch to the releasing state of releasing the locking of the load-carrying platform 6 at its load-carrying position.

As shown in FIGS. 3-7 and FIG. 17, in the rear frame portion 10C, the cross member 18 is located between the front supporting members 24 and the rear supporting members 25. And, in this cross member 18, its right and left end portions are disposed on more laterally outer sides of the vehicle body than the right and left second side members 17, and via these right and left end portions 18, the cross member 18 supports upper end portions of right and left shock absorbers 13C provided in the right and left rear suspensions 13.

With the above arrangement, it is possible to dispose the right and left shock absorbers 13C, right and left springs (not shown) provided in the right and left rear suspensions 13 at positions on laterally outer sides of the vehicle body distant from the engine section 2 having such heat source as the muffler 32, across the right and left second side member 17, etc. As a result, in comparison with an arrangement of e.g. disposing the upper end portions of the right and left shock absorbers 13C at positions on more inner sides of the vehicle body than the right and left second side members 17, it is possible to reduce the possibility of occurrence of thermal damage due to radiation heat from such heat source as the muffler 32 in e.g. the right and left shock absorbers 13C and the right and left springs.

Further, by supporting the right and left shock absorbers 13C by the single cross member 18, in comparison with an arrangement of e.g. supporting the right and left shock absorbers 13C by right and left supporting members provided separately at the right and left end portions of the rear frame portion 10C, it is possible to simplify the arrangement required for supporting the right and left shock absorbers 13C and also to facilitate assembly of the right and left shock absorbers 13C at appropriate positions.

As shown in FIGS. 4-8, FIG. 10, FIG. 12 and FIG. 17, the cross member 18 includes extension portions 18A which extend from its right and left end portions to positions on more laterally outer sides of the vehicle body than the upper end portions of the right and left shock absorbers 13C. And, an electric cable supporting clamp 71 is attached to the right extension portion 18A of the cross member 18 under a posture protruding laterally outwards of the vehicle body from these right and left extension portions 18A of the cross member 18.

With the above arrangement, for connection to e.g. the electro-hydraulic cylinder 7 disposed on more rear side of the vehicle body than the right and left shock absorbers 13C, portions of various electric cables 72 to be laid along the right and left second side members 17 can be laid to bypass the upper end portions of the right and left shock absorbers 13C, through positions on more laterally outer side of the vehicle body than the upper end portions of the right and left shock absorbers 13C. As a result, it is possible to avoid risk of the various electric cables 72 laid along the right and left shock absorbers 17 coming into inadvertent contact with the upper portions of the right and left shock absorbers 13C connected to the right and left end portions of the cross member 18.

Figure 12:
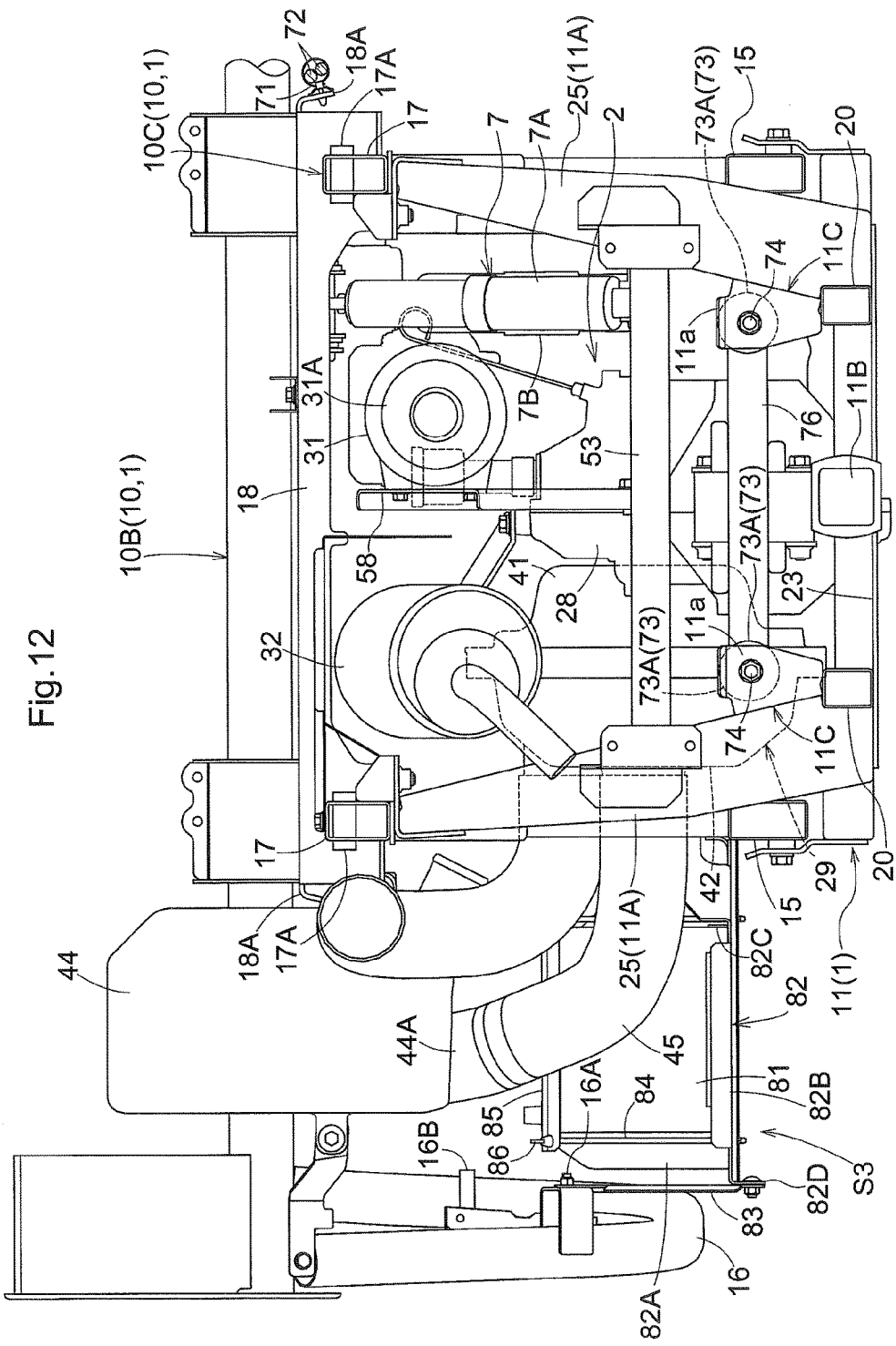
FIG. 12 is a rear view of principal portions showing arrangements of e.g. a rear portion of a vehicle body frame and an engine section.
Figure 13:
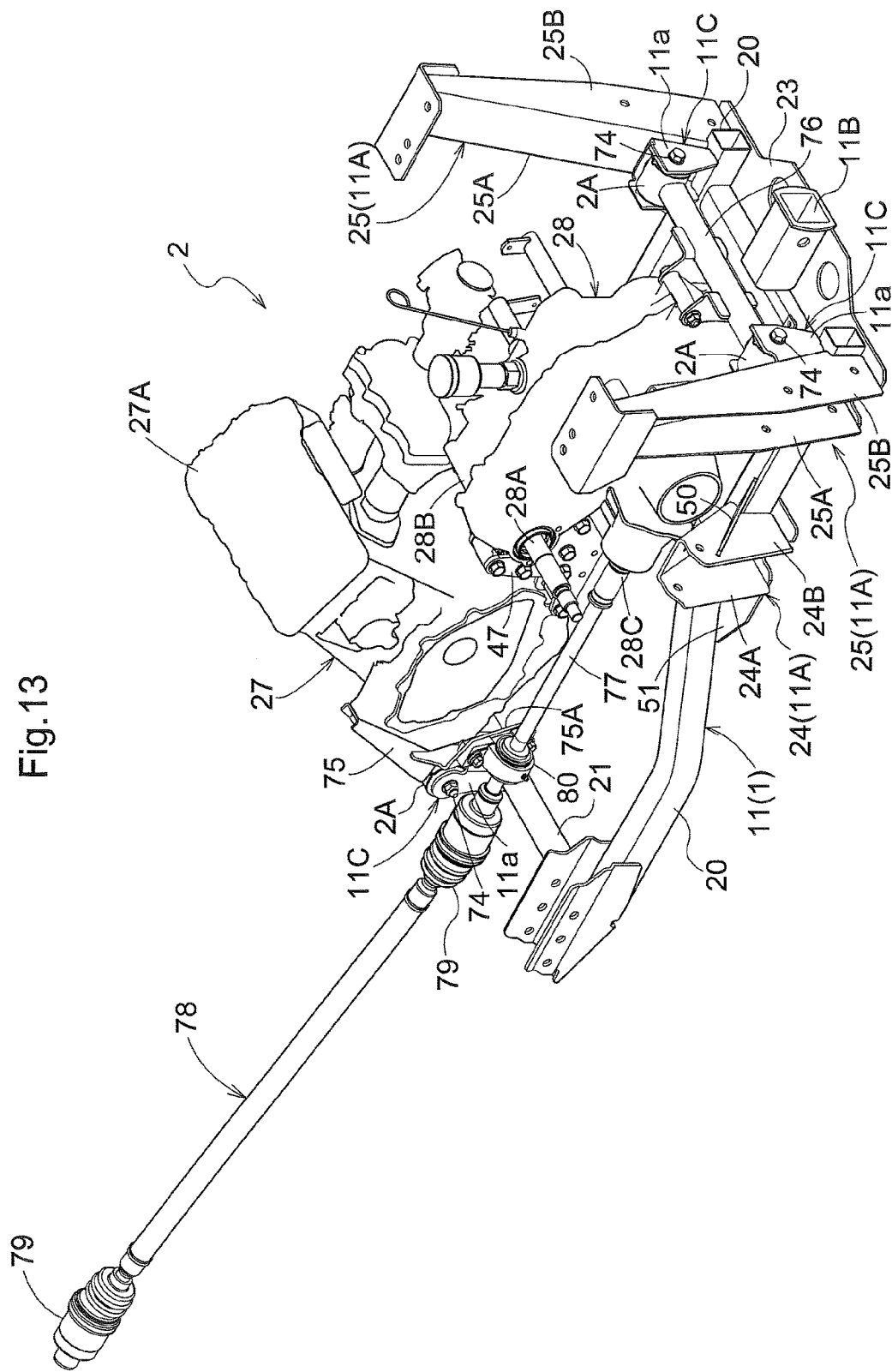
FIG. 13 is a perspective view of principal portions showing arrangements of e.g. a rear portion of a vehicle body frame and an engine section.
Figure 14:
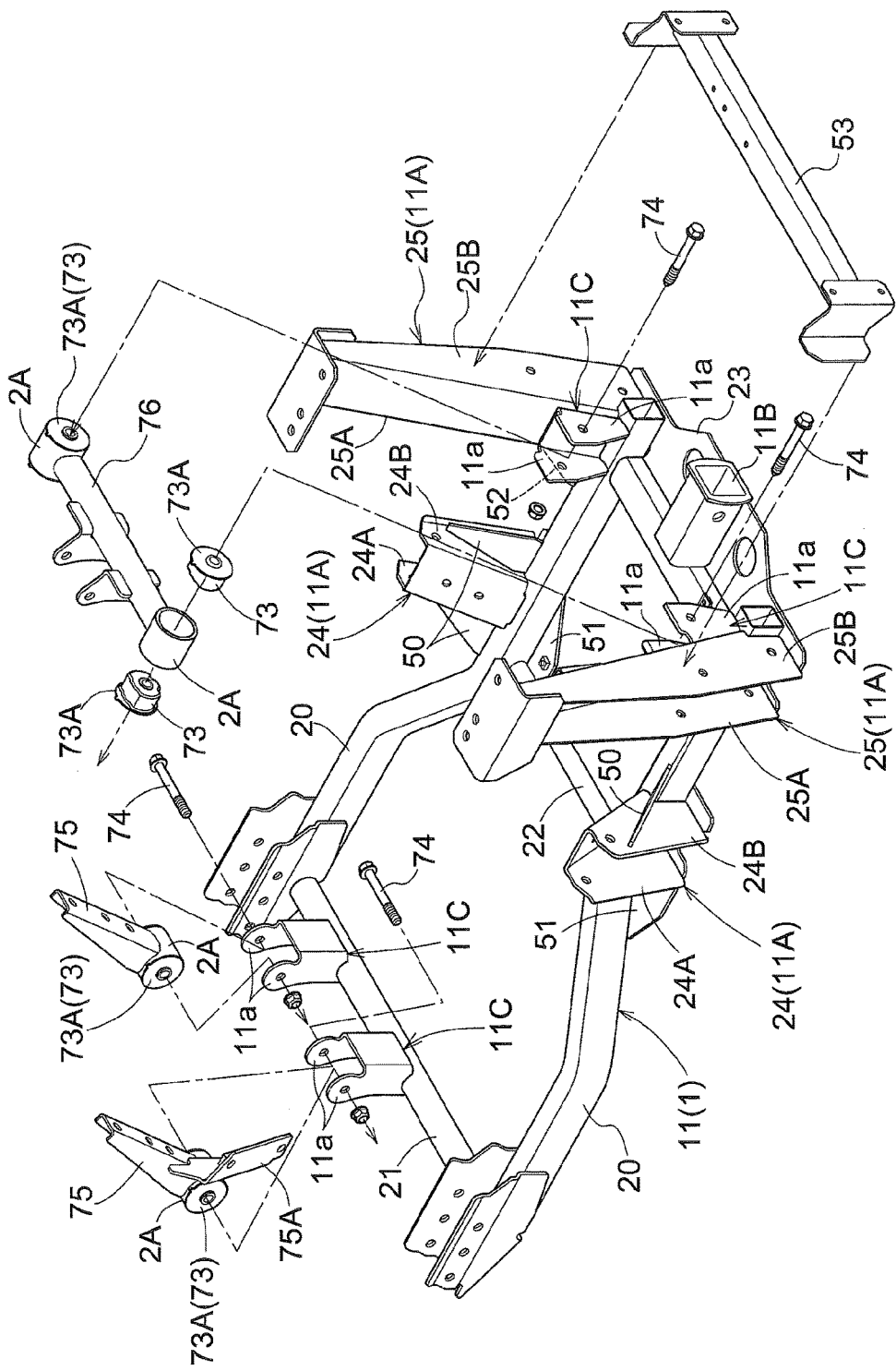
FIG. 14 is a partially exploded perspective view of principal portions showing an arrangement of e.g. a rear frame, an arrangement of the engine section.
Figure 15:
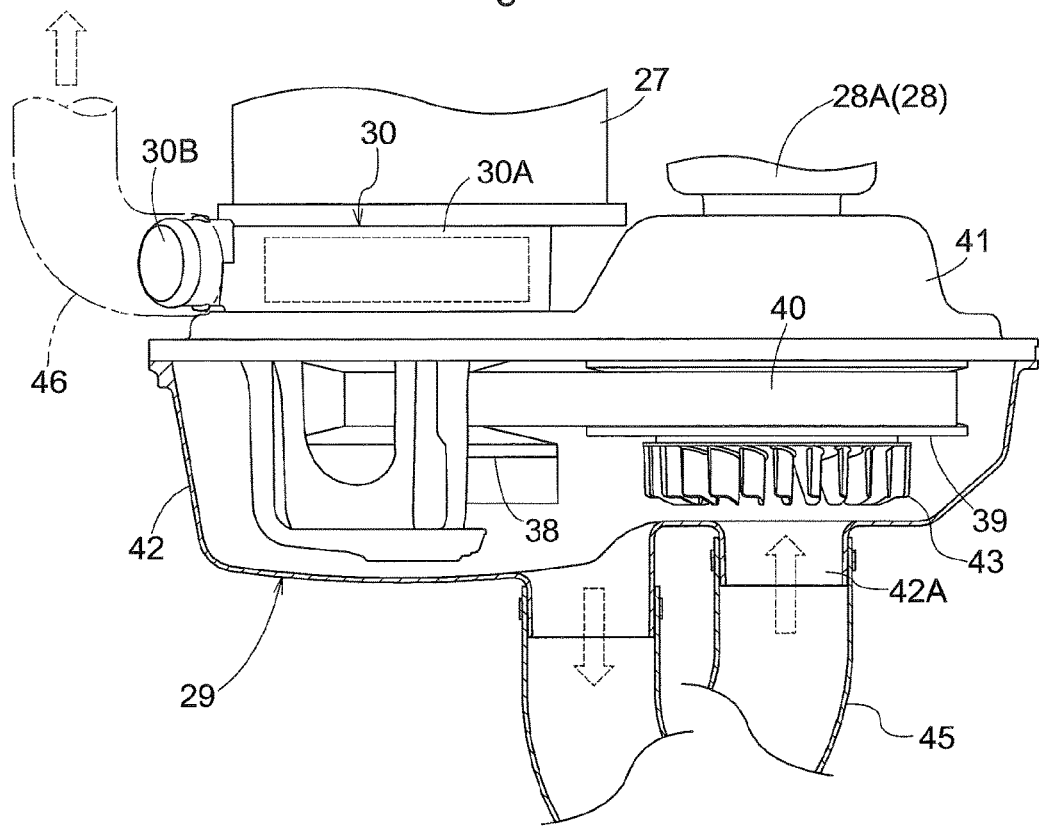
FIG. 15 is a plan view in partial section of a belt type stepless speed changer device and its periphery showing an arrangement of e.g. the belt type stepless speed changer device.

In the embodiment as shown in FIG. 12, the illustrated clamp 71 is attached to the right extension portion 18A. Instead thereof, the electric cable supporting clamp 71 may be attached to the left extension portion 18A. Alternatively, the electric cable supporting clamp 71 may be attached to each of the right and left extension portion 18A.

As shown in FIG. 3 and FIGS. 6-14, the rear frame 11 includes right and left supporting portions 11C for supporting right and left supported portions 2A provided at front and rear end portions of the engine section 2. Each supporting portion 11C has a U-shape in its plan view having a pair of vertical walls 11a opposed to each other, and is formed like a cylinder disposed between the pair of vertical walls 11a with opposed ends of the cylinder being adjacent the pair of vertical walls 11a. And, in the rear frame 11, each supporting portion 11C is configured to support the respective supported portion 2A in anti-vibration manner, via a pair of anti-vibration rubbers 73 engaged inwardly with the respective supported portion 2A and a bolt 74 as a support shaft extending through the anti-vibration rubbers 73 between the pair of vertical walls 11a, etc.

And, the movement restricting directions are made different as follows between a support state where the right and left supported portions 2A are supported by the right and left supporting portions 1C on the front end side of the rear frame 11, and a further support state where the right and left supported portions 2A are supported by the right and left supporting portions 11C on the rear end side of the rear frame 11. In the front end side support state, the right and left supported portions 2A are located between the pair of vertical walls 11a disposed side by side on the right and left provided in the right and left supporting portions 11C, thus being restricted in movement thereof in the right/left direction. Whereas, in the rear end side support state, the right and left supported portions 2A are located between the pair of vertical walls 11a disposed side by side on the front and rear provided in the right and left supporting portions 11C, thus being restricted in movement thereof in the front/rear direction. In this way, the movement restricting directions are made different from each other between the front end side and the rear end side of the rear frame 11.

With the above arrangement, on the front end side of the rear frame 11, by the front end side support state described above, it is possible to ensure anti-vibration performance against vibration of the engine section 2 in the right/left direction in association with an operation of the engine 27 and also to reduce the amplitude of vibration of the engine section 2 in the vertical direction in association with the operation of the engine 27 at the same time. On the rear end side of the rear frame 11, by the rear end side support state described above, it is possible to ensure anti-vibration performance against vibration of the engine section 2 in the vertical direction in association with an operation of the engine 27 and also to reduce the amplitude of vibration of the engine section 2 in the front/rear direction in association with the operation of the engine 27 at the same time. Namely, it is possible to ensure anti-vibration performance against vibration of the engine section 2 in the vertical direction in association with an operation of the engine 27 and also to reduce the amplitude of vibration of the engine section 2 in the horizontal direction at the same time. With this, at the time of e.g. start-up of the engine 27 when particularly large amplitude vibration of the engine section 2 occurs, it is possible to avoid the possibility of interference between the engine section 2 and the components present in its periphery in the horizontal vicinity of the engine section 2, such as the right and left second side members 17, the right and left front supporting members 24, the electro-hydraulic cylinder 7, etc.

Each anti-vibration rubber 73 includes a flange 73A at one end portion thereof. And when each anti-vibration rubber 73 supports each supported portion 2A by its each supporting portion 11C in the anti-vibration manner, each flange 73A is disposed between one end portion of each supported portion 2A and the vertical walls 11a of each supporting portion 11C, thus preventing inadvertent contact between the opposed end portions of each supported portion 2A and the pair of vertical walls 11a of each supporting portion 11C.

With the above arrangement, when the movement of the respective supported portion 2A in the right/left direction or the front/rear direction is to be restricted by the pair of vertical walls 11a of the respective supporting portion 11C, it is possible to prevent occurrence of such inconvenience as frictional wear in the respective supported portion 2A and the respective supporting portion 11C or generation of noise due to inadvertent contact between the opposed end portions of the respective supported portion 2A and the pair of vertical walls 11a of the respective supporting portion 11.

The engine section 2 includes the front side right and left supported portions 2A at the lower end portions of right and left brackets 75 connected to right and left opposed end portions of the front lower portion of the engine 27. Further, the engine section 2 includes the rear side right and left supported portions 2A at the right and left opposed end portions of a connecting member 76 elongate in the right/left direction connected to a rear portion of the speed changer device 28.

The rear frame 11 includes the front side right and left supporting portions 11C attached erect on the first cross member 21. Further, the rear frame 11 includes the rear side right and left supporting portions 11C extending between the side members 20 and the rear side supporting members 25. And, the rear side right and left supporting members 11C function also as reinforcing members for reinforcing the rear portion of the rear frame 11.

As shown in FIG. 1, FIG. 2, FIG. 5, FIGS. 7-9, FIG. 11 and FIG. 13, the engine section 2 has a space S2 for power transmission at a position downwardly of the clutch 30 between the engine 27 and the belt type stepless speed changer device 29. The speed changer device 28 includes the forwardly extending output shaft 28C for driving the front wheels provided at a left end portion of a front lower portion which is opposed to the power transmission space S2 at its lower portion, with a transmission shaft 77 connected to this output shaft 28C with alignment of rotational center of the former with that of the latter being caused to extend through the power transmission space S2.

With the above arrangement, a front wheel transmission line 78 extending from the front wheel driving output shaft 28C to an input shaft 14A of the front wheel differential mechanism 14 need not extend on the lower or laterally outer side of the engine section 2. Thus, in comparison with an arrangement of its extending the lower or laterally outer side of the engine section 2, it is possible to reduce the operational angle of each universal joint 79, while keeping the minimum value (i.e. two) regarding the number of such universal joints 79 to be provided in the front wheel transmission line 78. As a result, it becomes possible to realize simplification of the arrangement of the front wheel transmission line 78 and also to suppress reduction in power transmission efficiency, reduction in durability due to heat generation, which may occur when the operational angle of the respective universal joint 79 is large.

Further, for reducing the operational angle of the respective universal joint 79 with the front wheel transmission line 78 extending on the lower or laterally outer side of the engine section 2, the above arrangement eliminates need for taking such measure as increasing the disposing height of the engine 27 relative to the speed changer device 28 or offsetting the engine 27 to the right/left side. Thus, it is possible to avoid occurrence of such inconvenience as deterioration in the stability of the vehicle body due to higher gravity center position of the vehicle body or deterioration in the right/left balance of the vehicle body due to the right/left offsetting of the engine 27.

Incidentally, it is preferred to employ a constant-speed joint as the universal joint 79. With the employment of such constant-speed joint, it is possible to avoid deterioration in the power transmission efficiency resulting from increase of the operational angle.

The clutch 30 includes, at the bottom of the clutch case 30A, a receded portion 30C upwardly receded for allowing introduction of the transmission shaft 77, the receded portion 30C extending between front and rear opposed ends of the clutch case 30A.

With the above arrangement, it is possible to reduce the disposing height of e.g. the engine 27 together with the clutch 30, without increasing the operational angle of the respective universal joint 79. As a result, the gravity center position of the vehicle body can be lowered, thus improving the stability of the vehicle body.

Of the right and left brackets 75 mentioned above, the left bracket 75, with its supporting portion 75A extending to the left side from its lower portion and via a bearing 80 attached to this supporting portion 75A, supports a front end side of the transmission shaft 77. The transmission shaft 77 has its front end portion disposed on more front side of the vehicle body than the front end of the engine 27.

With the above arrangement, in a stage prior to assembling the engine section 2 with the rear frame 11, the transmission shaft 77 can be readily assembled to the engine section 2. And, it is possible to facilitate connection of the front wheel transmission line 78 to the front end portion of the transmission shaft 77, which connection is to be effected after assembly of the engine section 2 to the rear frame 11.

As shown in FIG. 1, FIG. 2, FIGS. 4-7, FIG. 11, FIG. 12 and FIG. 22, a supporting platform 82 for receiving and supporting a battery 81 from under is provided at the front end portion of the rear frame portion 10C, with the supporting platform 82 extending in a cantilever manner from the left end portion of the rear frame portion 10C to the left outer side of the vehicle body.

With the above arrangement, of right and left spaces S3 disposed adjacent the intermediate frame portion 10B on the laterally outer side of the rear frame portion 10C obtained by a difference of lateral width between the intermediate frame portion 10B and the rear frame portion 10C, the left space S3 can be effectively utilized as a disposing space for the battery.

The main frame 10 includes an installing member 83 that can be switched over between an in-use state where the installing member 83 is installed under a downwardly oriented posture from the intermediate frame portion 10B to an extension end portion of the supporting platform 82 and a non-use state where the installing member 83 is not used. The installing member 83, in the non-use state, keeps open the left outer side of the battery 81.

With this arrangement, by causing the battery 81 to be received and supported by the supporting platform 82 and then switching the installing member 83 to the in-use state, the left end portion of the supporting platform 82, as an extension end portion, can be supported to the intermediate frame portion 10B via the installing member 83 suspended from the intermediate frame portion 10B. As a result, the heavy battery 81 can be received and supported in a stable manner by the supporting platform 82 which is firmly supported at its both ends to the main frame 10.

Moreover, when a maintenance operation of the battery 81 such as a replenishing operation of battery solution or a replacement of the battery is to be carried out, the lateral outer side of the battery 81 can be opened up by rendering the installing member 83 into the non-use state. With the above, a carry-out operation of the battery 81 from the battery supporting platform or a carry-in operation of the battery 81 to a lateral outer side of the vehicle body which is effected before or after a maintenance operation can be carried out easily with sliding the heavy battery 81 on the supporting platform, without inviting inconvenience of the operation being interfered by the installing member 83. Consequently, a maintenance operation of the battery 81 can be easily effected, without needing to remove the air cleaner 44 or the intake pipe 45 for cooling the belt type stepless speed changer device disposed rearwardly and upwardly of the battery 81.

The supporting platform 82 includes: a first raised portion 82A raised along the right/left direction of the vehicle body at a front end portion of the supporting platform 82; a second raised portion 82B raised along the right/left direction of the vehicle body at a rear end portion of the supporting platform 82; a third raised portion 82C raised along the right/left direction of the vehicle body at an inner end portion of the vehicle body 82, and so on.

With this arrangement, when a carry-out operation or a carry-in operation of the battery 81 relive to the supporting platform 82 is to be effected, the sliding movement of the battery 81 on the supporting platform 82 can be restricted by the respective raised portions 82A-82C. So that, inadvertent displacement of the battery 81 off the supporting platform 82 in the front/rear direction or to the inner side of the vehicle body can be avoided.

Further, the respective raised portions 82A-82C can be used also as a reinforcing rib for the supporting platform 82, so that the strength of the supporting platform 82 which is mounted in the cantilever manner can be increased.

The first raised portion 82A comprises a vertical wall which receives the front end portion of the battery 81 when the battery 81 is located at its predetermined support position on the supporting platform 82. The third raised portion 82C comprises a vertical wall which receives the right end portion of the battery 81 when the battery 81 is located at its predetermined support position on the supporting platform 82.

With the above arrangement, by mounting the battery 81 on the supporting platform 82 and and then sliding this battery 81 on the supporting platform so that the front end portion of the battery 81 comes into contact with the first raised portion 82A and the right end portion of the battery 81 comes into contact with the third raised portion 82C, the battery 81 can be readily disposed at the predetermined support position on the supporting platform 82.

The intermediate frame portion 10B includes, at a rear lower portion of its left end portion adjacent the extension end portion of the supporting platform 82, the installing member 83 which can be pivotally displaced between an in-use position where the installing member 83 assumes the in-use state and a non-use position where the installing member 83 assumes the non-use state.

With this arrangement, it is possible to avoid loss of the installing member 83 which could occur, in case the installing member 83 configured to be detachable and a detached state thereof is used as the non-use state.

The intermediate frame portion 10B forms a getting on/off space with the U-shaped members 16 disposed on the right and left end portions thereof and so on. Of the right and left U-shaped members 16, the left side U-shaped member 16 disposed on the side of the supporting platform includes, at a lower portion of a rear portion adjacent the extension end portion of the supporting platform 82, a right/left oriented support shaft portion 16A that pivotally supports the installing member 83 and a receiving portion 16B that receives the installing member 83 at its non-use position. The receiving portion 16B is disposed rearwardly and upwardly of the support shaft portion 16A, and receives and supports the free end side of the installing member 83 located at its non-use position from the rear lower side thereof. The supporting platform 82 includes, at a rear side portion of its left end portion, a connecting portion 82D to be bolt-connected to the free end portion of the installing member 83, the connecting portion 82D being suspended from the supporting platform 82.

With the above arrangement, by pivotally displacing the installing member 83 to the in-use position and then bolt-connecting the free end portion of the installing member 33 to the connecting portion 82D of the supporting platform 82, the installing member 83 can be rendered into the in-use state where the installing member 83 is installed under a rearwardly lowered inclined posture from the intermediate frame portion 10B to the left end portion of the supporting platform 82.

Further, by releasing the bolt-connection between the free end portion of the installing member 83 and the connecting portion 82D of the supporting platform 82 and then pivotally displacing the installing member 83 clockwise as seen in its left side view to be received by the receiving portion 16B, the installing member 83 can be maintained by the weight of its own at the non-use position more upward than the support shaft portion 16A, under a rearwardly upwardly inclined posture along the rear portion of the U-shaped member 16. With this, the left outer side opened state of the battery 81 can be maintained. As a result, carry-in operation or a carry-out operation of the battery 81 relative to the supporting platform 82 from the left outer side of the vehicle body can be effected easily.

The supporting platform 82 includes, as components for fixing the battery, two rods 84, an angle member 85 and two butterfly nuts 86. And, the supporting platform 82 includes, at its right and left opposed end portions on the front end side, elongate slots 82E into which one end portion of the respective rod 84 is to be inserted. Each rod 84 includes, at one end portion thereof, a hook portion 84A which is to be hooked to an elongate slot circumferential edge portion of the supporting platform 82. Each rod 84 includes a male thread portion 84B at its other end portion. The angle member 85 includes, at its opposed end portions, through holes 85A in which the male thread portions 84B of the rods 84 are to be inserted.

With the above arrangement, when the battery 82 mounted at the predetermined position on the supporting platform 82 is to be fixed to this supporting platform 82, firstly, the male thread portion 84B of each rod 84 will be inserted into each through hole 85A of the angle member 85, and then each butterfly nut 84B of each rod 84 will be attached to each male thread portion 84B after the insertion. Next, the hook portion 84A of each rod 84 will be inserted into the right/left elongate slot 82E of the supporting platform 82 and hooked to the elongate slot circumferential edge portion of the supporting platform 82. Further, the receded portion 85B of the angle member 85 will be brought into contact with the corner portion of the rear upper end of the battery 81. Thereafter, each butterfly nut 86 will be fastened thereby to clamp the battery 81 between the supporting platform 82 and the angle member 85, whereby the battery 81 can be fixed at the predetermined support position on the supporting platform 82.

In the supporting platform 82, its first raised portion 82A functions also as a supporting member for supporting a regulator 87. With this, it is possible to realize e.g. simplification of the arrangement through reduction in the number of parts.

Other Embodiments

The present invention is not limited to the arrangements illustrated in the foregoing embodiment. Next, some typical alternative embodiments of the present invention will be described.

[1] The utility work vehicle can be configured as a diesel type having a diesel engine as the engine 27. Further alternatively, the utility work vehicle can be configured as a hybrid type having the engine 27 and an electric motor for traveling, or can be configured as an electrically driven type having an electric motor for traveling, in place of the engine 27.

[2] The utility work vehicle can be configured as a type such as four-persons riding type in which three or more persons can ride in the riding section 3 or can also be configured as a one-person type in which only one person can ride in the riding section 3.

[3] The utility work vehicle can include a hydraulic cylinder or an electrically driven cylinder, in place of the electro-hydraulic cylinder 7.

[4] The belt type stepless speed changer device 29 can be disposed on the right side of the engine 27 and the speed changer device 28.

[5] In the foregoing embodiment, the muffler 32 was shown as an example of the exhaust gas treating device. However, the invention is not limited thereto. Alternatively, the exhaust gas treating device can be an exhaust gas cleaning device having an oxidization catalyst or an exhaust gas treating device having an oxidization catalyst and a DPF (Diesel Particulate Filter) or the like.

[6] The support state where the right and left supported portions 2A are supported by the right and left supporting portions 11C on the front end side of the rear frame 11, and the further support state where the right and left supported portions 2A are supported by the right and left supporting portions 11C on the rear end side of the rear frame 11, are not limited to those in the foregoing embodiment. Instead thereof, in the front end side support state, the right and left supported portions 2A may be located between the pair of vertical walls 11a disposed side by side on the front and rear provided in the right and left supporting portions 11C, thus being restricted in movement thereof in the front/rear direction. In the rear end side support state, the right and left supported portions 2A may be located between the pair of vertical walls 11a disposed side by side on the right and left provided in the right and left supporting portions 11C, thus being restricted in movement thereof in the right/left direction. In this way, the movement restricting directions may be made different from each other alternatively between the front end side and the rear end side of the rear frame 11.

[7] Each supported portion 2A of the engine section 2 may be formed into a U-shape in its plan view having a pair of vertical walls opposed to each other. Each supporting portion 11C of the ear frame 11 may be formed into a cylindrical shape disposed between the pair of vertical walls with opposed ends thereof being adjacent the pair of vertical walls of the respective supported portion 2A.

[8] The electro-hydraulic cylinder 7 may be supported by the left side rear wheel supporting portion 11A. In this case, preferably, the air cleaner 31 and the exhaust gas treating device (muffler 32) will be disposed side by side on the right and left between the right and left rear wheel supporting portions 11A, with the air cleaner 31 being disposed on the left side, the exhaust gas treating device (muffler 32) being disposed on the right side,

[9] The electro-hydraulic cylinder 7 can be supported by the rear side vertical walls 25B of the rear side supporting members 25. Further, the electro-hydraulic cylinder 7 can be supported by either front or rear one of the vertical walls 24A, 24B of the front side supporting members 24 provided in the rear wheel supporting portions 11A.

[10] The electro-hydraulic cylinder 7 can be supported by the rear wheel supporting portion 11A on the exhaust gas treating device side adjacent the exhaust gas treating device (muffler 32), of the right and left rear wheel supporting portions 11A. In this case, preferably, some thermal damage countermeasure will be provided, such as disposing a heat shielding plate or heat insulating material, between the electro-hydraulic cylinder 7 and the exhaust gas treating device (muffler 32).

[11] In case the electro-hydraulic cylinder 7 is to be supported by the rear wheel supporting portion 11A on the air cleaner side, this electro-hydraulic cylinder 7 can be disposed on more laterally outer side of the vehicle body than the air cleaner side rear wheel supporting portion 11A. Further, in case the electro-hydraulic cylinder 7 is to be supported by the rear wheel supporting portion 11A on the exhaust gas treating device side, this electro-hydraulic cylinder 7 can be disposed on more laterally outer side of the vehicle body than the exhaust gas treating device side rear wheel supporting portion 11A.

[12] Various modifications are possible in the layout of the air cleaner 31. For instance, the air cleaner 31 may be disposed at a rear portion of the vehicle body, with the oil filter element replacement cap 31A being under a laterally oriented posture located at one right/left end portion of the air cleaner 31, and with the cap 31A being disposed on more laterally outer side of the vehicle body than the right and left rear wheel supporting portions 11A. Further, the air cleaner 31 may be disposed in an accommodation space at a front portion of the vehicle body.

[13] The supporting platform 82 may be disposed at the front end portion of the rear fame portion 10C, to extend in a cantilever manner from the right end portion of the rear frame portion 10C to the right outer side of the vehicle body. Further alternatively, the supporting platform 82 may be disposed at the rear end portion of the front fame portion 10A, to extend in a cantilever manner from one right/left right end portion of the front frame portion 10A to the laterally outer side of the vehicle body.

Incidentally, in case the supporting platform 82 is to be disposed on the right side of the front end portion of the rear frame portion 10C, preferably, the installing member 83 will be disposed to be pivotally displaceable at the rear lower portion of the right end portion of the intermediate frame portion 10B, which is a portion adjacent the extension end portion (right end portion) of the supporting platform 82.

In case the supporting platform 82 is to be disposed on the left side of the rear end portion of the front frame portion 10A, preferably, the installing member 83 will be disposed to be pivotally displaceable at the front lower portion of the left end portion of the intermediate frame portion 10B, which is a portion adjacent the extension end portion (left end portion) of the supporting platform 82.

In case the supporting platform 82 is to be disposed on the right side of the rear end portion of the front frame portion 10A, preferably, the installing member 83 will be disposed to be pivotally displaceable at the front lower portion of the right end portion of the intermediate frame portion 10B, which is a portion adjacent the extension end portion (right end portion) of the supporting platform 82.

[14] The shape of the supporting platform 82 can vary in many ways. For instance, the supporting platform 82 can include only one/some of the first raised portion 82A, the second raised portion 82B and the third raised portion 82C, or can include none of these. Further alternatively, the supporting platform 82 can include a raised portion for reinforcement or a bent portion for reinforcement, etc.

[15] The installing member 83 can be configured as a detachable type which can be attachable and detachable between an in-use state and a non-use state. Further alternatively, the installing member 83 can be configured as a sliding type which is slidable between an in-use state and a non-use state.

[16] The posture of the installing member 83 at its in-use position can be set as a perpendicular posture where the member 83 suspends from the intermediate frame portion 10b to the extension end portion of the supporting platform 82.

[17] In case the installing member 83 is provided to be pivotally displaceable, the posture of this installing member 83 at its non-use position can be set as a perpendicular posture where the member 83 suspends from the support shaft portion 16A of the intermediate frame portion 10B, thus eliminating necessity of the receiving portion 16B in the intermediate frame portion 10B.

[18] The support shaft portion for pivotally supporting the installing member 83 can be provided at the extension end portion of the supporting platform 82; and the connecting portion to be bolt-connected to the free end portion of the installing member 83 can be provided at the portion adjacent the extension end portion of the supporting platform 82 in the intermediate frame portion 10B.

[19] The fixation of the installing member 83 under its in-use state can employ various fixing arrangements such as a bolt connection, a pin connection, etc.

[20] The present invention is applicable to other types of work vehicle such as a tractor, a grass mower, a riding rice planter, etc., in place of the utility work vehicle.

What is claimed is:
1. A utility work vehicle comprising:
  an engine section including an engine having its output shaft oriented laterally along a right/left direction of a vehicle body, a speed changer device having its input shaft oriented laterally along the right/left direction of the vehicle body, the speed changer device being disposed rearwardly of the engine, and a belt type stepless speed changer device disposed on one right/left side of the engine and the speed changer device and configured to transmit power from the engine to the speed changer device;
  a rear frame supporting the engine section, the rear frame including right and left rear wheel supporting portions provided at right and left end portions disposed on more laterally outer sides of the vehicle body than the engine section and configured to support right and left rear wheels via right and left rear suspensions, each one of the right and left rear wheel support portions having a front supporting member and a rear supporting member extending upwards from the rear frame; and
  a main frame supporting the rear frame;
  wherein the rear supporting member is disposed on more rear side of the vehicle body than the belt type stepless speed changer device, the rear supporting member having a vertical length extending from the rear frame to a rear frame portion of the main frame disposed upwardly of the rear frame to connect an upper end portion of the rear supporting member to the rear frame portion; and
  wherein the front supporting member is disposed on more laterally outer side of the vehicle body than the belt type stepless speed changer device, the front supporting member having a vertical length smaller than the rear supporting member, the front supporting member forming, between an upper end of this front supporting member and the rear frame portion, a space that allows attachment/detachment of a speed changer cover detachably attached to the belt type stepless speed changer device from a laterally outer side of the vehicle body.

2. The utility work vehicle according to claim 1, wherein:
the engine section includes an exhaust gas treating device;
the rear frame portion includes: right and left side members, each of the side members having an upper end portion of the rear supporting member associated therewith connected thereto; and a cross member disposed between the front supporting member and the rear supporting member, and connecting the right and left side members to each other; and
the cross member has its right and left end portions disposed on more laterally outer sides of the vehicle body than the right and left side members, the cross member, via its right and left end portions, supporting upper end portions of right and left shock absorbers provided in the right and left rear suspensions.

3. The utility work vehicle according to claim 2, wherein:
the cross member includes extension portions extending from its right and left end portions to positions on more laterally outer sides of the vehicle body than the upper end portions of the right and left shock absorbers; and
an electric cable supporting clamp is attached to at least one of the right and left extension portions, with the clamp protruding laterally outwardly of the vehicle body from the extension portion associated therewith.

4. The utility work vehicle according to claim 1, further comprising:
a load-carrying platform connected to the rear frame portion to be pivotally lifted up/down relative thereto; and
an electro-hydraulic cylinder for lifting up/down the load-carrying platform, the electro-hydraulic cylinder being supported by the rear supporting member.

5. The utility work vehicle according to claim 1, wherein:
the rear frame includes, on its front and rear end sides, right and left supporting portions for supporting right and left supported portions provided at front and rear end portions of the engine section;
one of the supporting portion and the supported portion has a U-shape in its plan view having a pair of vertical walls opposed to each other, and the other of the supporting portion and the supported portion is formed like a cylinder disposed between the pair of vertical walls with opposed ends of the cylinder being adjacent the pair of vertical walls;
the supporting portion is configured to support the supported portion in anti-vibration manner, via a tubular anti-vibration rubber engaged inwardly with one of this supporting portion and the supported portion, and via a support shaft extending through the anti-vibration rubber between the pair of vertical walls; and
wherein a movement restricting direction of the supported portion is made to differ between a support state of the right and left supported portions by the right and left supporting portions on a front end side of the rear frame, and a support state of the right and left supported portions by the right and left supporting portions on a rear end side of the rear frame;
in one of the two support states, the supporting portions or the supported portions are located between the pair of vertical walls which are disposed side by side on the right and left sides, so that movement in right/left direction is restricted; and
in the other of the two support states, the supporting portions or the supported portions are located between the pair of vertical walls which are disposed side by side on the front and rear sides, so that movement in front/rear direction is restricted.

6. The utility work vehicle according to claim 1, further comprising:
a battery; and
a supporting platform receiving and supporting the battery from under;
wherein the main frame of the vehicle body frame includes a front frame portion, an intermediate frame portion and a rear frame portion;
the intermediate frame portion has a sufficient lateral width with its right and left end portions being disposed on more laterally outer sides of the vehicle body than right and left end portions of the front frame portion and right and left end portions of the rear frame portion;
the supporting platform is disposed at an end portion of the front frame portion or the rear frame portion on the side of the intermediate frame portion, with the supporting platform extending in a cantilever manner from one right/left end portion of the front frame portion or the rear frame portion toward a lateral outer side of the vehicle body;
there is provided an installing member that can be switched over between an in-use state where the installing member is installed under a downwardly oriented posture from the intermediate frame portion to an extension end portion of the supporting platform, and a non-use state where the installing member is not used; and
the installing member, in the non-use state, keeps open the battery on a laterally outer side of the vehicle body.

7. The utility work vehicle according to claim 6, wherein the supporting platform includes a first raised portion raised along the right/left direction of the vehicle body at a front end portion of the supporting platform, a second raised portion raised along the right/left direction of the vehicle body at a rear end portion of the supporting platform, and a third raised portion raised along the right/left direction of the vehicle body at an inner end portion of the vehicle body.

8. The utility work vehicle according to claim 6, wherein the intermediate frame portion includes the installing member at a portion thereof adjacent an extension end portion of the supporting platform, with the installing member being pivotally displaceable between an in-use position providing the in-use state and a non-use position providing the non-use state.

9. The utility work vehicle according to claim 8, wherein the intermediate frame portion includes, at a portion thereof adjacent the extension end portion of the supporting platform, a support shaft portion for pivotally supporting the installing member and a receiving portion for receiving the installing member at its non-use position.

10. A utility work vehicle comprising:
a vehicle body frame, the vehicle body frame including a front portion extending in a forward direction of travel of the work vehicle and a rear portion, wherein the vehicle body frame further comprises, at a rear end portion thereof, right and left rear wheel supporting portions for supporting right and left rear wheels via right and left rear suspensions;
a load-carrying platform connected to the rear portion of the vehicle body frame to be liftable up/down relative thereto; and
an electro-hydraulic cylinder for lifting up/down the load-carrying platform, the electro-hydraulic cylinder being supported by one rear wheel supporting portion of the right and left rear wheel supporting portions.

11. The utility work vehicle according to claim 10, further comprising:

an air cleaner; and an exhaust gas treating device;

wherein the air cleaner and the exhaust gas treating device are disposed side by side on the right and left sides between the right and left rear wheel supporting portions; and the electro-hydraulic cylinder is supported by the air cleaner side rear wheel supporting portion adjacent the air cleaner of the right and left rear wheel supporting portions.

12. The utility work vehicle according to claim 11, wherein the electro-hydraulic cylinder is disposed between the air cleaner and the air cleaner side rear wheel supporting portion.

13. The utility work vehicle according to claim 11, wherein:

the air cleaner is disposed at the rear end portion of the vehicle body; and the air cleaner includes, at its rear end portion, a cap for oil filter element replacement, the cap being disposed rearwardly of the right and left rear wheel supporting portions.

14. The utility work vehicle according to claim 10, further comprising:

a battery; and a supporting platform receiving and supporting the battery from under;

wherein a main frame of the vehicle body frame includes a front frame portion, an intermediate frame portion and a rear frame portion;

the intermediate frame portion has a sufficient lateral width with its right and left end portions being disposed on more laterally outer sides of the vehicle body than right and left end portions of the front frame portion and right and left end portions of the rear frame portion;

the supporting platform is disposed at an end portion of the front frame portion or the rear frame portion on the side of the intermediate frame portion, with the supporting platform extending in a cantilever manner from one right/left end portion of the front frame portion or the rear frame portion toward a lateral outer side of the vehicle body;

there is provided an installing member that can be switched over between an in-use state where the installing member is installed under a downwardly oriented posture from the intermediate frame portion to an extension end portion of the supporting platform, and a non-use state where the installing member is not used; and the installing member, in the non-use state, keeps open the battery on a laterally outer side of the vehicle body.

15. The utility work vehicle according to claim 14, wherein the supporting platform includes a first raised portion raised along the right/left direction of the vehicle body at a front end portion of the supporting platform, a second raised portion raised along the right/left direction of the vehicle body at a rear end portion of the supporting platform, and a third raised portion raised along the right/left direction of the vehicle body at an inner end portion of the vehicle body.

16. The utility work vehicle according to claim 14, wherein the intermediate frame portion includes the installing member at a portion thereof adjacent an extension end portion of the supporting platform, with the installing member being pivotally displaceable between an in-use position providing the in-use state and a non-use position providing the non-use state.

17. The utility work vehicle according to claim 16, wherein the intermediate frame portion includes, at a portion thereof adjacent the extension end portion of the supporting platform, a support shaft portion for pivotally supporting the installing member and a receiving portion for receiving the installing member at its non-use position.

* * * * *